A. W. GEORGE.
MACHINE AND METHOD FOR SHAPING AND ASSEMBLING BLANKS.
APPLICATION FILED MAR. 23, 1918.
1,346,490.   Patented July 13, 1920.
12 SHEETS—SHEET 11.
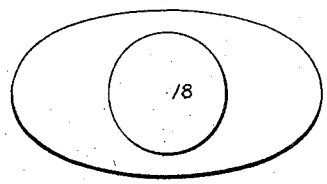 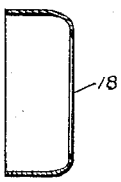 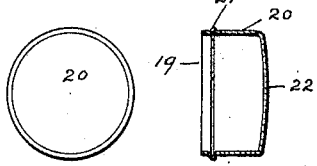
Fig. 20.   Fig. 21.   Fig. 22.   Fig. 23.
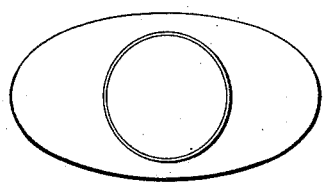 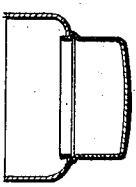 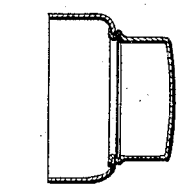
Fig. 24.   Fig. 25.   Fig. 26.
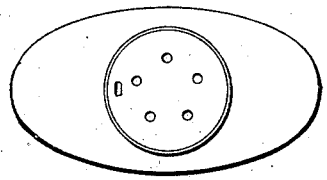 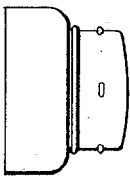 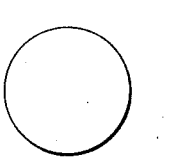 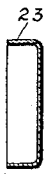
Fig. 27.   Fig. 28.   Fig. 29.   Fig. 30.
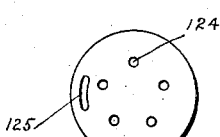 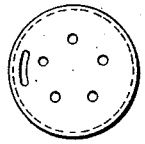 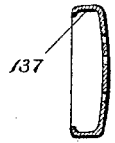
Fig. 31.   Fig. 32.   Fig. 33.
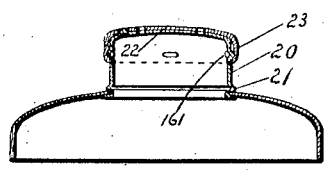
Fig. 34.
INVENTOR
A. W. George
BY
Duell, Warfield & Duell
ATTORNEY

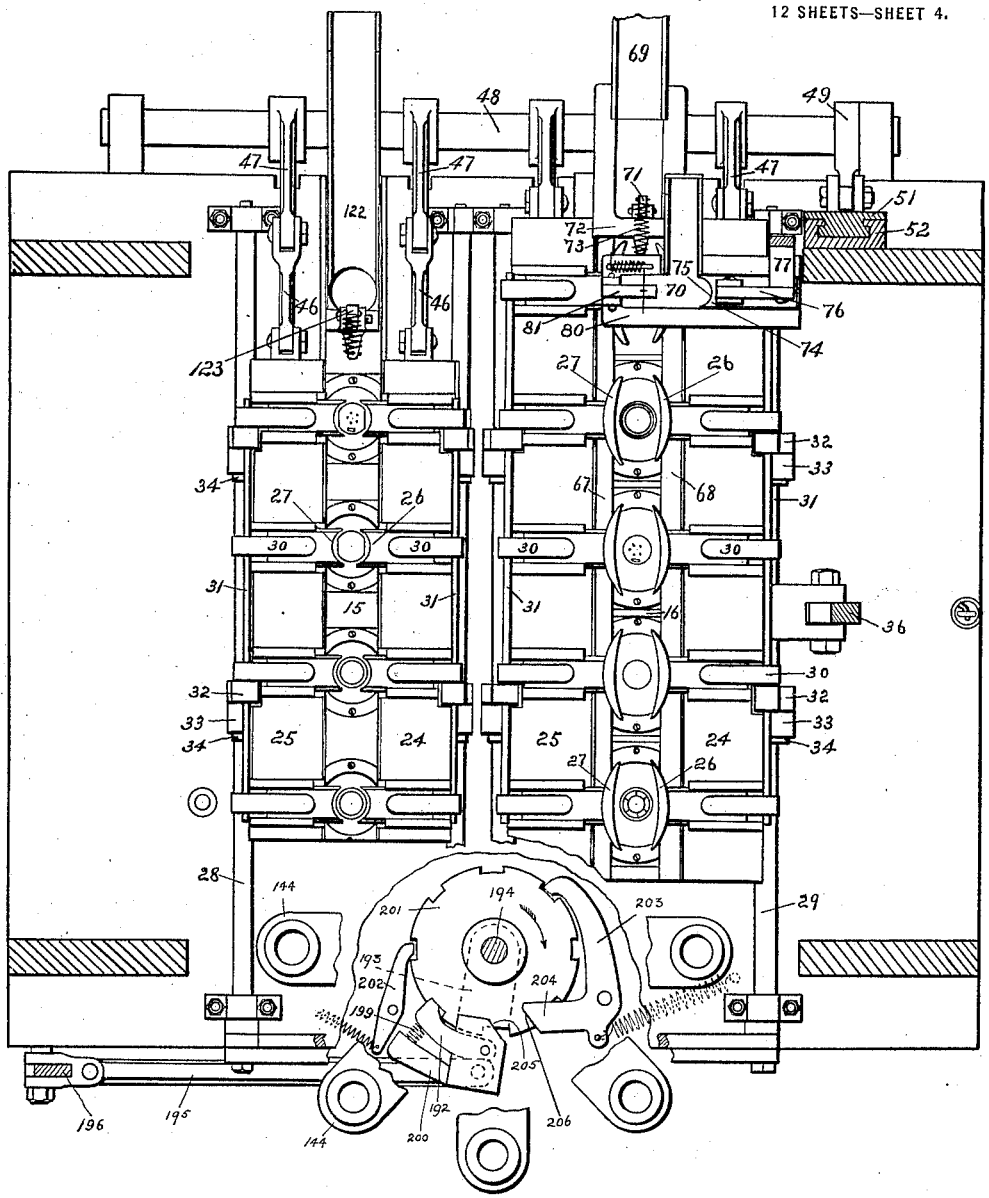

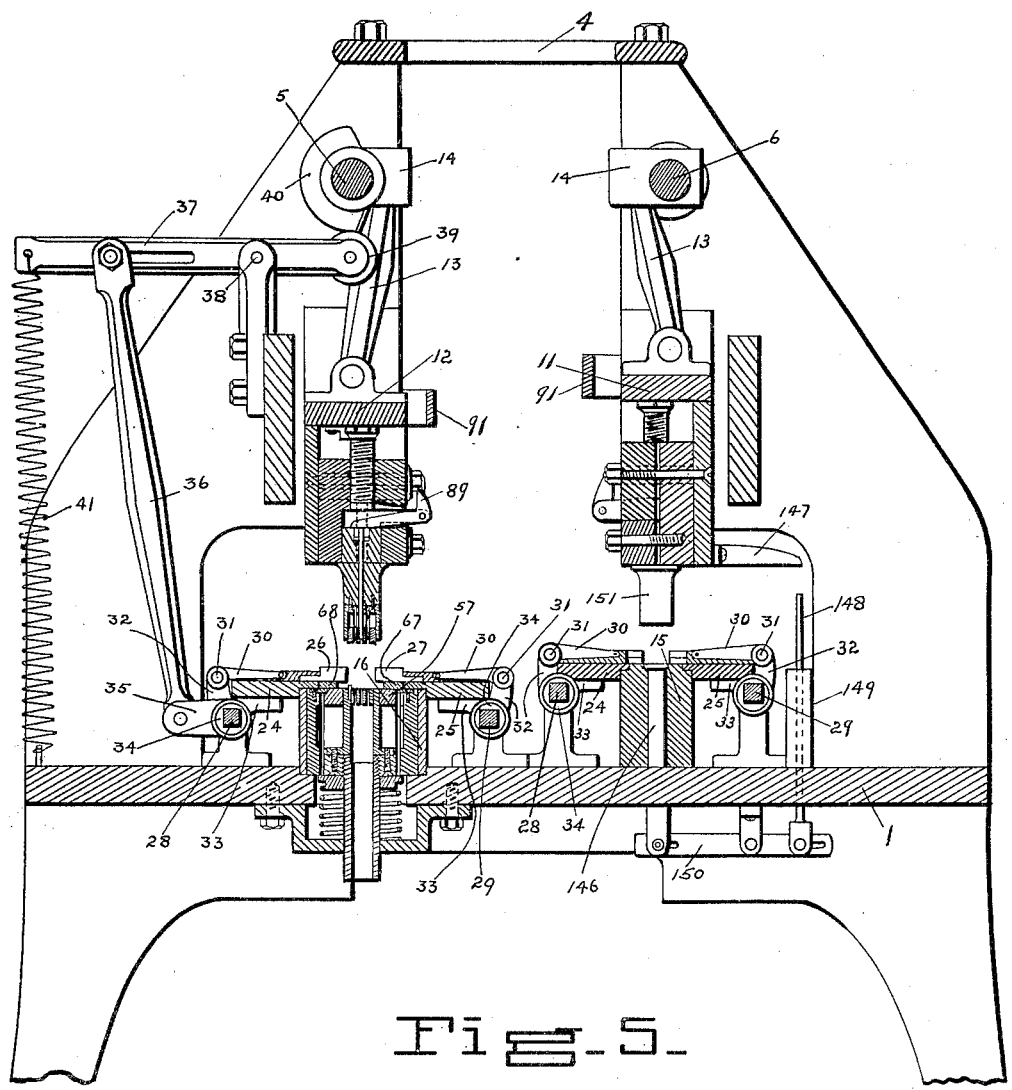

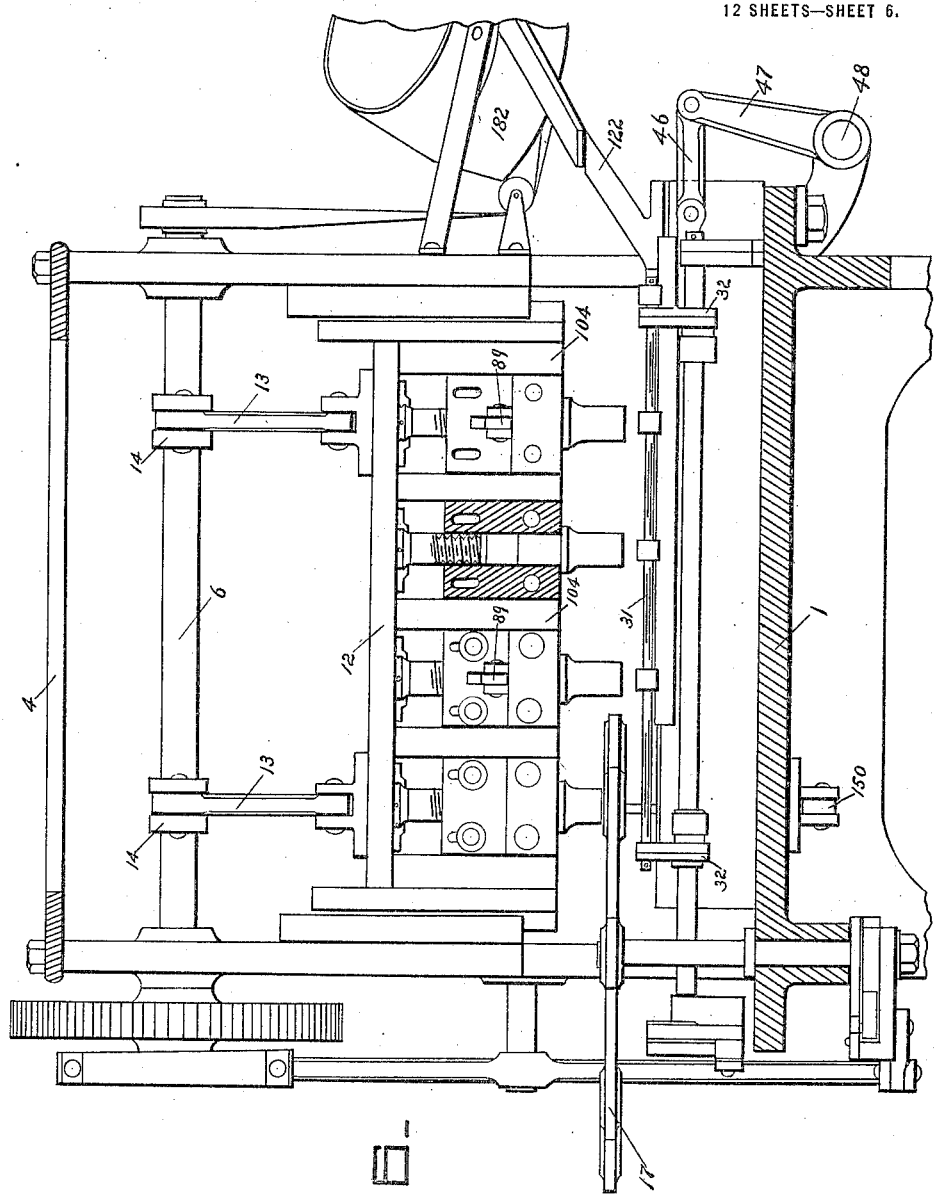

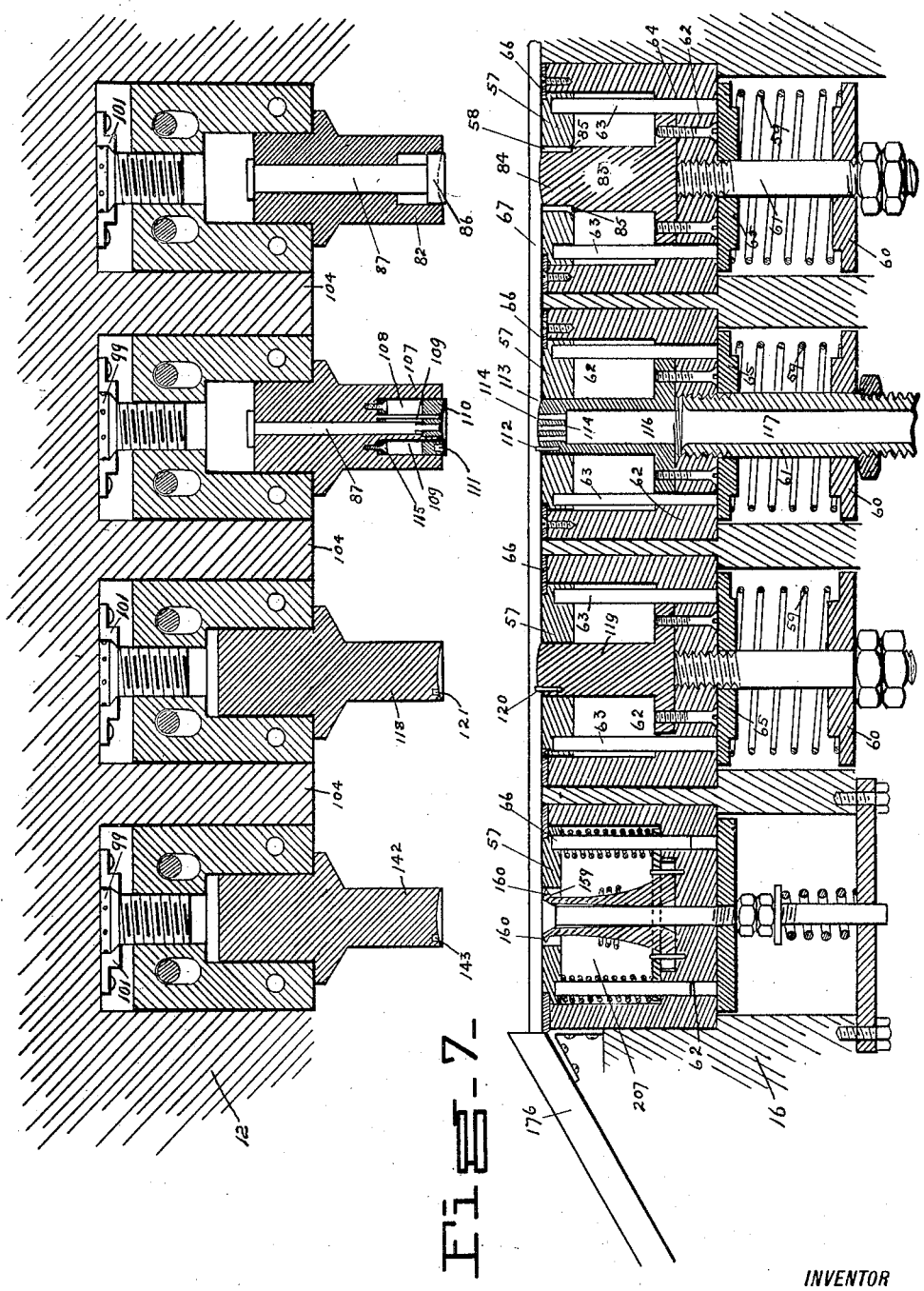

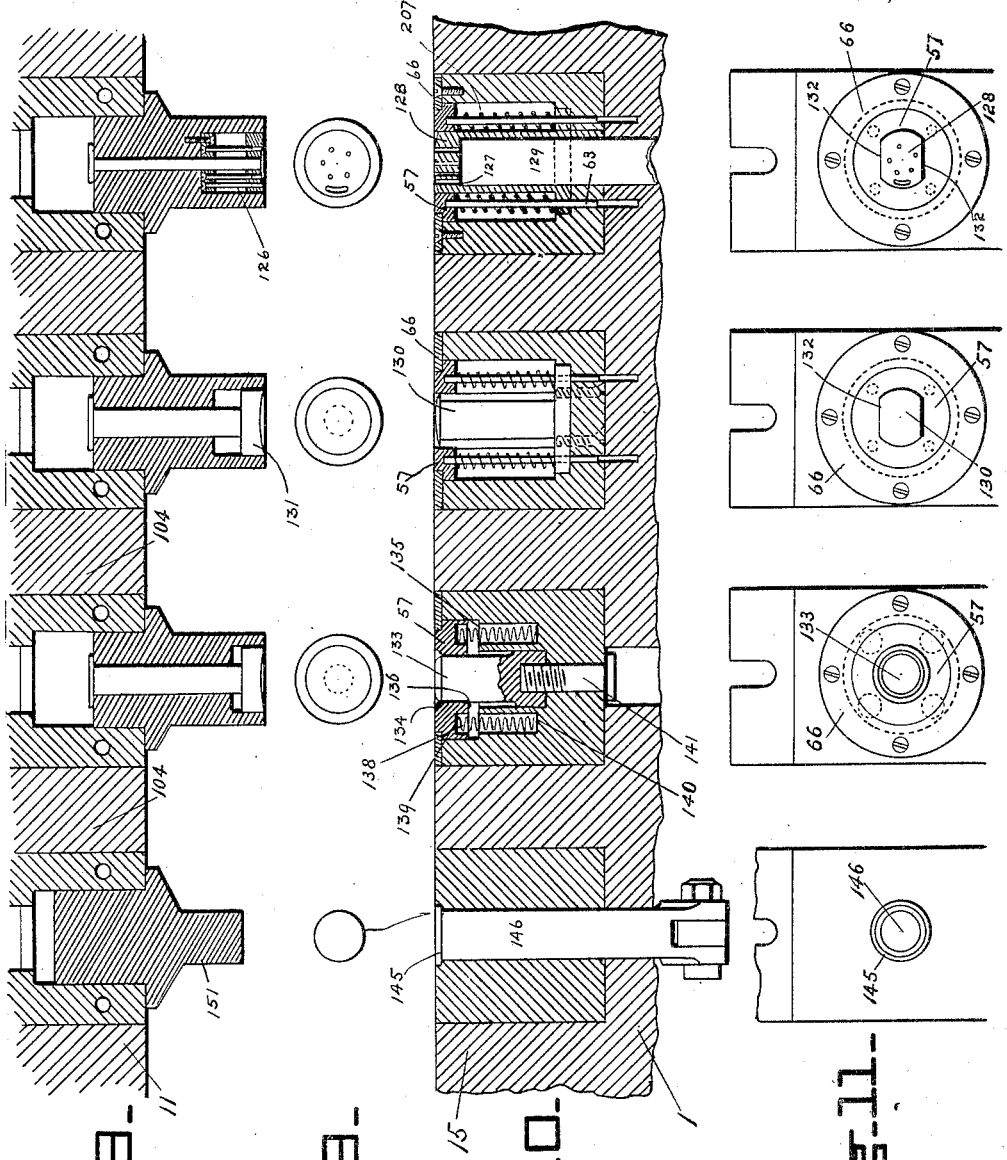

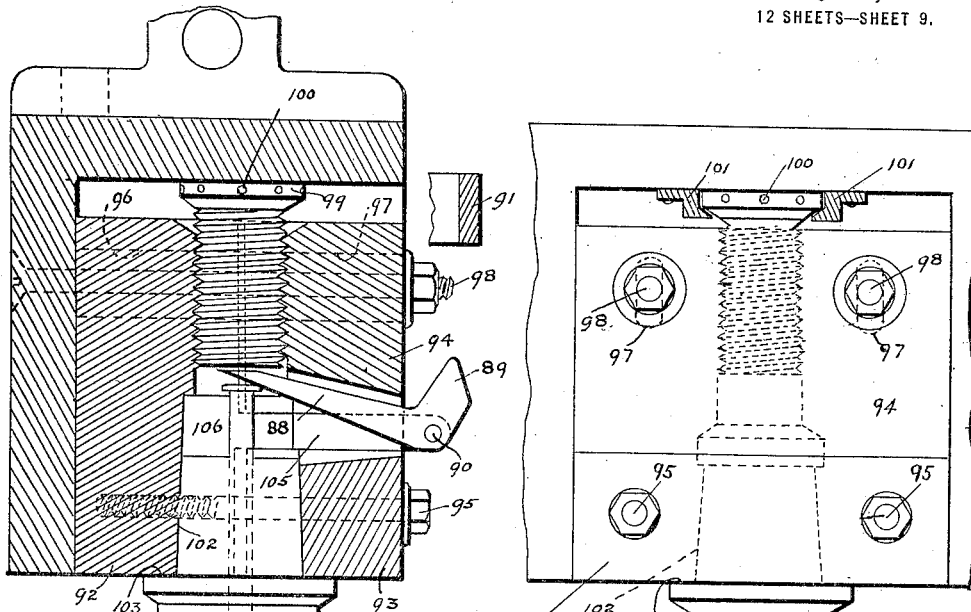
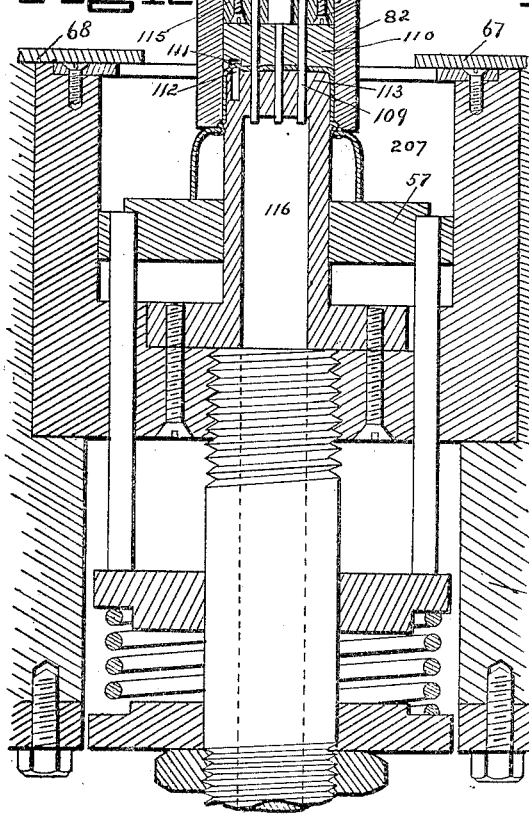
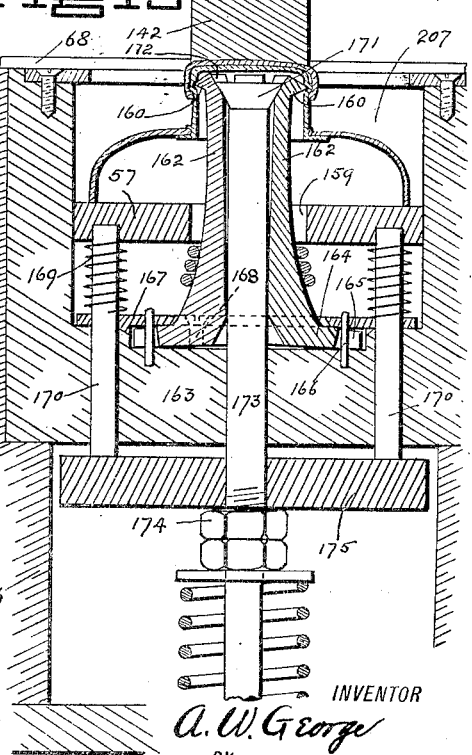

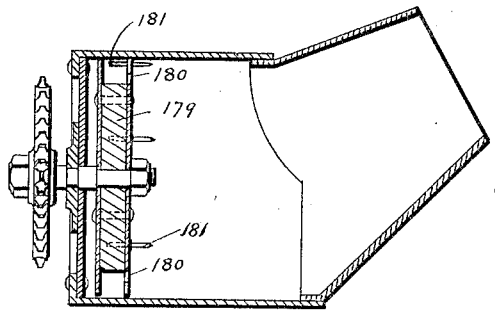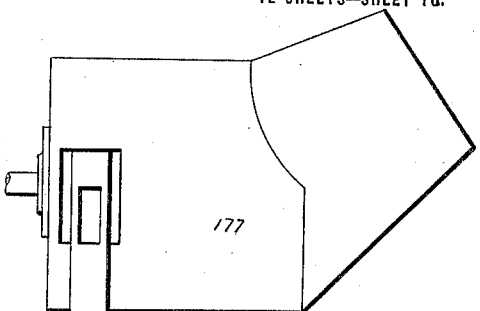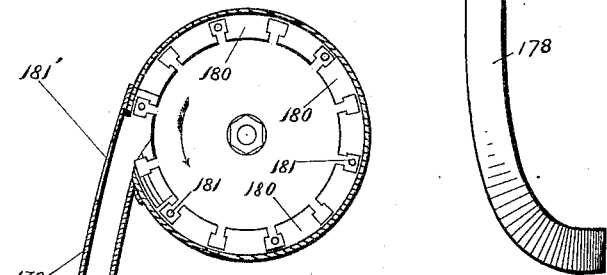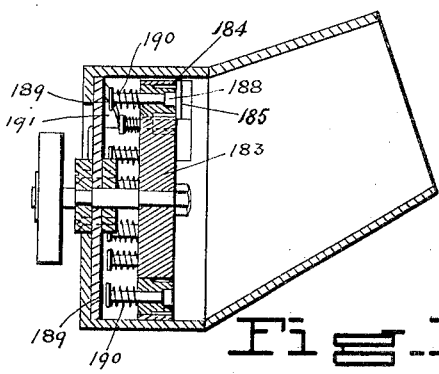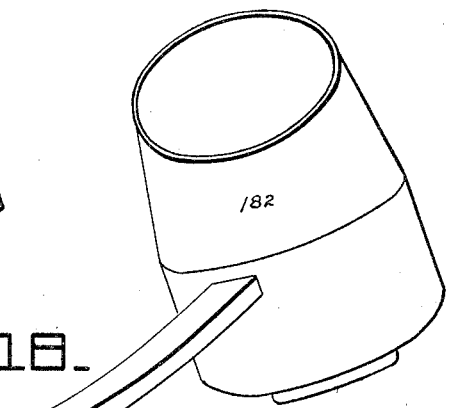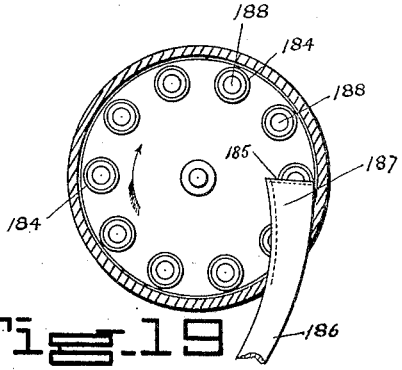

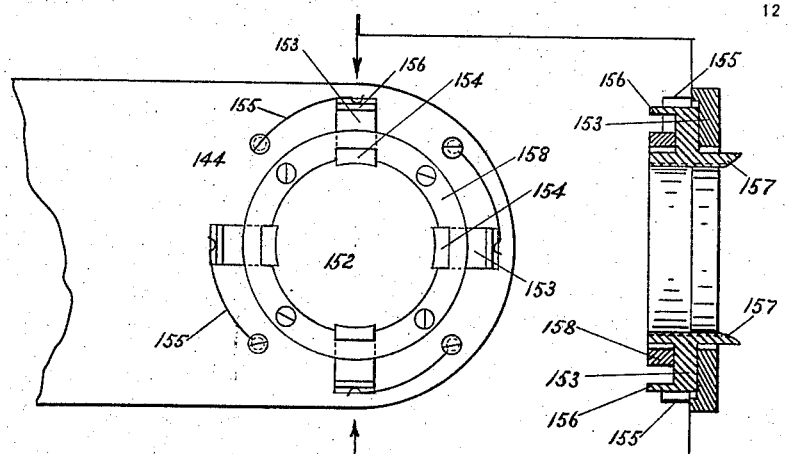
Fig. 35.
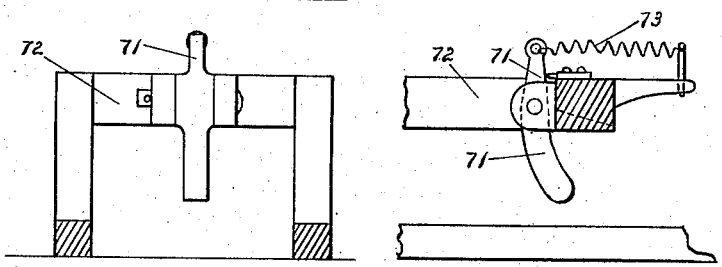
Fig. 36.
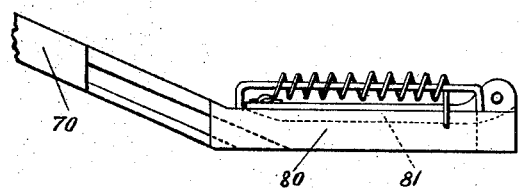
Fig. 37.
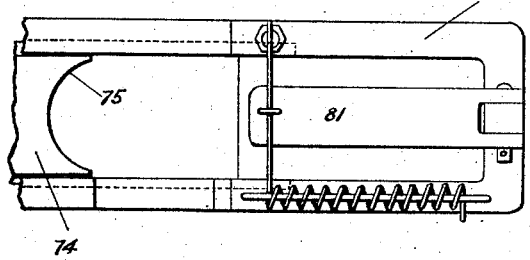

UNITED STATES PATENT OFFICE.

ALEXANDER W. GEORGE, OF BROOKLYN, NEW YORK, ASSIGNOR OF ONE-HALF TO SAMUEL H. BAER, OF BROOKLYN, NEW YORK.

MACHINE AND METHOD FOR SHAPING AND ASSEMBLING BLANKS.

1,346,490.   Specification of Letters Patent.   Patented July 13, 1920.

Application filed March 23, 1918. Serial No. 224,168.

*To all whom it may concern:*

Be it known that I, ALEXANDER W. GEORGE, a citizen of the United States, residing at Brooklyn, in the county of Kings and State of New York, have invented certain new and useful Improvements in Machines and Methods for Shaping and Assembling Blanks, of which the following is a full, clear, and exact description, such as will enable others skilled in the art to which it appertains to make and use the same.

This invention relates to machines for operating on material, especially sheet metal in blank form, and transforming the blank material, as by punching and cutting and otherwise reshaping the material so as to further the production of special blanks which may be used for various purposes. With respect to its more specific features, the invention relates to machines of the character referred to adapted to produce a metallic top for a container; to form various openings, movement-limiting and keeper elements in neck and cap blanks going to make up the top, and to accurately assemble the different kinds of blanks one with another in coöperative relation, one movable relative to the other but held thereon, all to the end that the top may be made quickly and accurately and with little, if any, manual labor.

One of the objects of the invention is the provision of an automatic machine for performing various operations on the same blank, coördinating the operations and controlling the blanks while being operated upon and while passing from one operative means to another.

Another object of the invention is the provision of an automatic machine for performing various different operations on different blanks and for both coördinating the operations with each other and with the operation of assembling one kind of blank with the other, the invention having special reference to operations on blanks of light weight.

Another object of the invention is the provision of an automatic machine having the utilities above referred to for operating on a plurality of different blanks at the same time.

Another object of the invention is the provision of a practical machine for assembling blanks, one or more of which may be said to be abnormal, in that the blank or blanks may be of different shape or different size, or both.

Another object of the invention is the provision of a practical method for operating upon and controlling blanks while being operated upon.

Another object of the invention is the provision of an efficient mechanism for feeding or translating blanks; a mechanism which may be utilized efficiently in automatically moving blanks from, for instance, one press operation to another.

Another object of the invention is the provision of a practical means for assembling blanks with each other in pairs or in triplicate, the mechanism having special relation to the assembly of blanks of different shape.

Another object of the invention is the provision of simple and practical pressing mechanism wherewith certain bending, perforating and other operations may be quickly and accurately performed without defacing the blanks and without detracting from the shape and size desired in the completed article.

Another object of the invention is to automatically effect the assembly of generally tubular blanks in accurate predetermined relation, so that parts of one blank will be in registry, or coöperative relation, with parts of another blank.

Another and special object of the invention is to effect the last mentioned object efficiently in connection with tubular blanks of which the exterior faces are of a finished character and of shapes which do not lend themselves readily to automatic control.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings forming a part of this specification, wherein similar reference characters refer to similar parts throughout the several views, Figure 1 is a view of the front of the machine;

Fig. 4 is a horizontal sectional view of the machine taken at a plane to disclose the feed tables and certain blank translating mechanism;

Fig. 5 is a vertical transverse section through the machine, certain parts being omitted for the sake of clearness;

Fig. 6 is a vertical longitudinal section of the machine, taken at a point approximately midway between the series of punching mechanisms;

Fig. 7 is a longitidutional vertical sectional view through one series of the coöperative pressing devices; certain frame portions being omitted;

Fig. 8 is a longituditional vertical sectional view through a series of press jaws;

Fig. 9 is a view of the several jaws of Fig. 8 looked at from beneath;

Fig. 10 is a longitudinal vertical sectional view through the blank feeding table and certain elements therein which coöperate with the press elements of Fig. 8;

Fig. 11 is a plan view of certain details of Fig. 8;

Fig. 12 is a transverse vertical sectional view of the press mechanism for perforating and nibbing the neck blank;

Fig. 13 is a longitudinal vertical sectional view of the press mechanism for forming certain keeper elements in one of the blanks operated upon by the machine;

Fig. 14 is a side view, and Figs. 15 and 16 sectional views of a magazine for supplying neck blanks for being operated upon by the machine;

Figs. 17, 18 and 19 are side and sectional views respectively of a certain magazine for supplying cap blanks to the machine;

Figs. 20 and 21 are plan and sectional views respectively of a body blank supplied to the machine;

Figs. 22 and 23 are respectively plan and sectional views of a neck blank supplied to the machine;

Figs. 24 and 25 are plan and sectional views, respectively, showing the initial assembly stage of the blank of Fig. 20 with the blank of Fig. 22;

Fig. 26 is a sectional view similar to Fig. 25, but showing the neck blank affixed to the body blank;

Fig. 27 is a plan view of the blank of Fig. 26 after it has been operated upon by certain perforating and nibbing devices;

Fig. 28 is a side view of the blank of Fig. 27 after it has been operated upon by mechanism for producing certain keeper devices in the side of the neck blank;

Figs. 29 and 30 are plan and sectional views respectively of a cap blank supplied to the machine;

Fig. 31 is a plan view of the blank of Fig. 29 after it has been perforated and slotted;

Figs. 32 and 33 are plan and sectional views respectively of the blank of Fig. 31 after it has been shaped and thereby provided with a certain keeper element;

Fig. 34 is a longitudinal sectional view of the article as produced by the machine;

Fig. 35 illustrates plan and sectional views of the gripper of the roulette;

Fig. 36 illustrates a detent device in end and side elevation; and

Fig. 37 illustrates neck blank assembling finger in plan and elevation.

Figure 1:
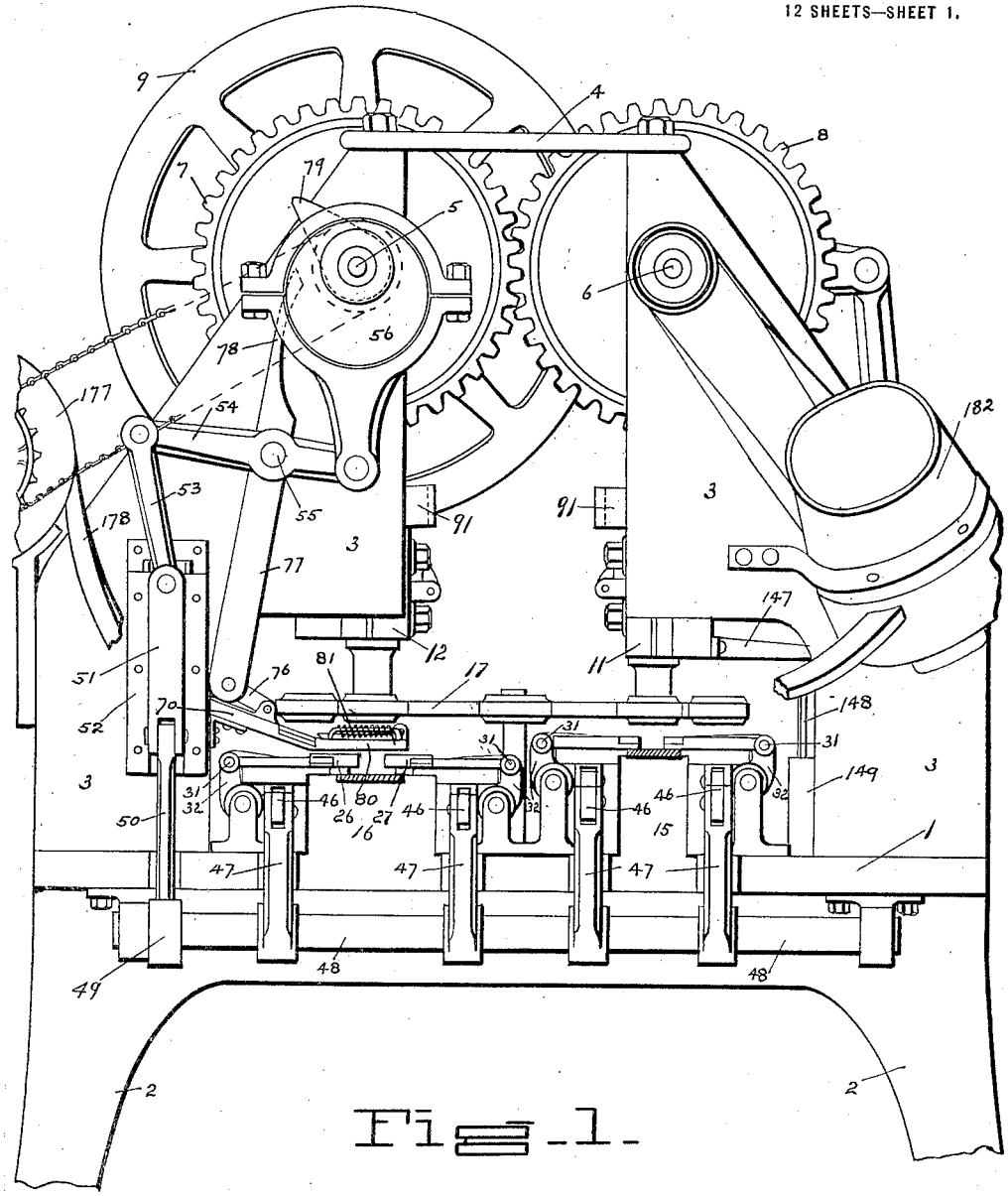
Figure 2:
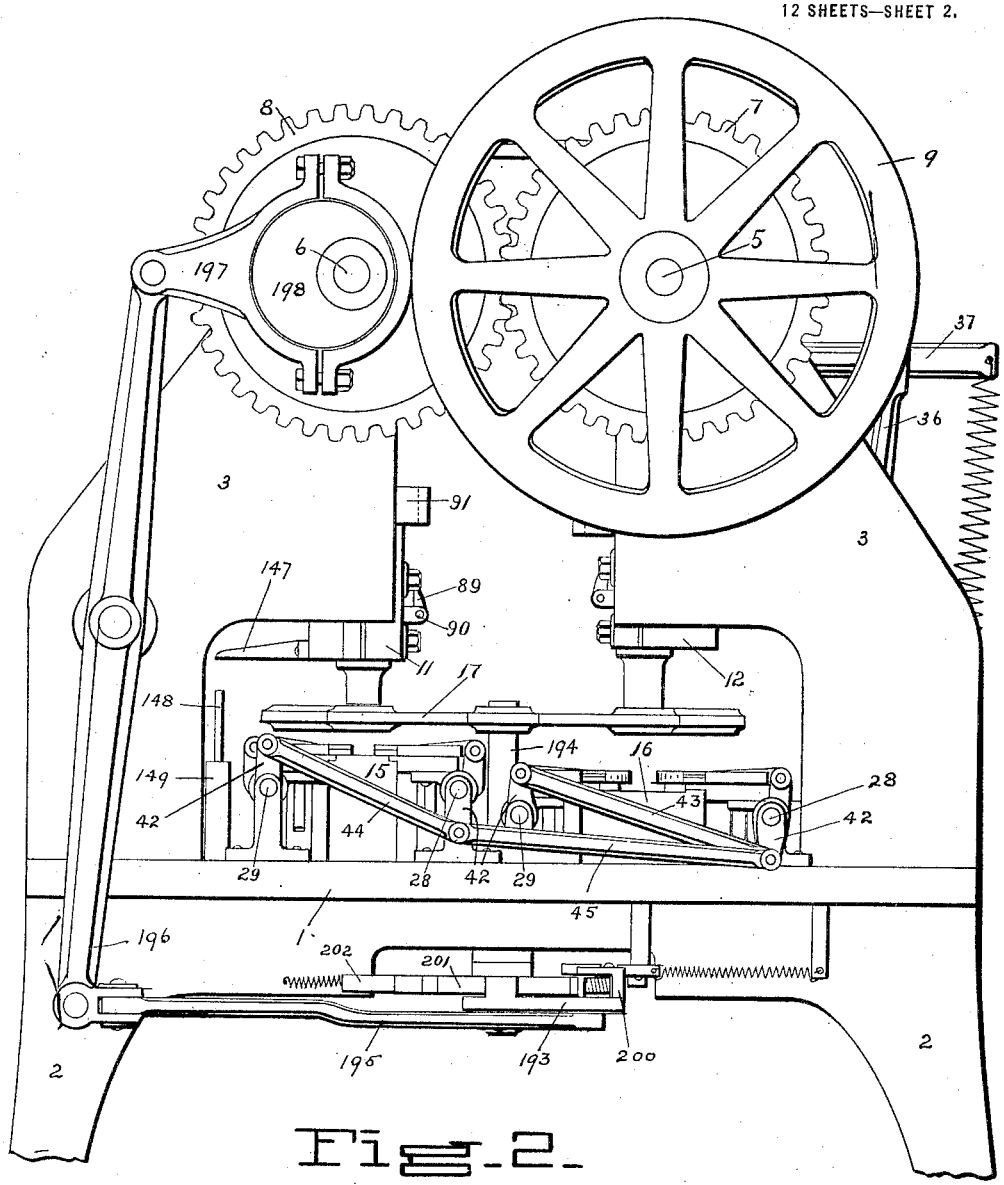
Fig. 2 is a view of the rear of the machine.

In order that the general construction and operation of the machine may be quickly apprehended, a brief reference to some of the main parts and their relations to each other will be given. The numeral 1 indicates a bed frame which may be supported on legs 2. Upstanding from the bed frame and firmly secured thereto on opposite sides thereof are standards 3, 3 braced by cross pieces 4 at the top and designed to provide a very substantial framework for supporting parts of certain pressing mechanisms hereinafter referred to. The numerals 5 and 6 indicate horizontal shafts respectively supported in suitable bearings in the upper portions of the standards, the numerals 7 and 8 indicating intermeshing gears of the same diameter fastened on the shafts 5 and 6 and designed to rotate said shafts in opposite directions. One of these shafts, as, for instance, 5, may serve as the main driving shaft of the machine, and for this purpose may be provided with a fly wheel 9 and a belt pulley 10, which latter may be rotatively mounted upon the driving shaft and coupled thereto as desired by a suitable form of clutch and clutch shifter (not illustrated). Vertically reciprocal in guides at the inner sides of the standards 3 are press heads 11 and 12 which are designed to carry certain elements of the presses and other operating mechanisms, as hereinafter more specifically described. These heads are connected to the shafts 5 and 6 by connecting rods and cranks 13 and 14 of such a substantial nature as to withstand the strains encountered in practice. Supported by each of the press heads are a series of elements, as press jaws, designed to coöperate with other press elements or jaws and successively with blanks supplied to the machine, and to generally reshape such blanks, such as by bending, perforating, compressing and otherwise reshaping the blanks. Beneath the jaws in the press head and generally between them and the coöperative press jaws referred to, are feed tables 15 and 16 (Fig. 4), there being in the present embodiment a feed table for each series of press elements, although it is to be understood that the invention might be embodied in a construction involving a single feed table with presses coöperating opposite different portions thereof. The feed tables may be made in sections, if desired, and the blanks to be operated upon travel along the tables from one press to another into and out of coöperation with the coöperative press jaws of each press, one series of press jaws being above the table as stated and another series of press jaws being below or substantially flush with the table.

The blanks, having undergone the operations of the presses, are assembled with each other, one blank resultant from one series of presses being assembled with a blank operated upon by presses of the other series. To effect this assembly a transfer mechanism is employed which comprises, in the present embodiment, an intermittently rotating blank carrier 17 (Fig. 3) having a series of blank grippers 144, to each of which the blanks coming from one series of presses are transferred and in turn transferred into coöperative relation for assembly with blanks operated upon by the other series of presses. The blanks having been operated upon by the presses and assembled one with another, as thus generally explained, are discharged from the machine.

To coördinate the operations of the machine and the operations on the different blanks and develop a machine of large capacity, as well as convenience, the press jaws coöperate with each other in a generally vertical direction and both series of upper press jaws operate simultaneously, so that different operations are performed on both kinds of blanks at each operative movement of the presses.

The blanks are supplied to the feed tables at one end of each of said tables, two kinds of blanks, a body blank and a neck blank, being supplied to the table 16 and one kind of blank, to wit: cap blanks, being supplied to the table 15. In the present embodiment certain body blanks are assembled with the neck blanks, and are of generally elliptical form in plan as illustrated in Fig. 20, the body blanks having openings 18 into which fits the open end 19 of a neck blank 20. The neck blanks are of a generally cylindrical shape, as indicated in Fig. 22, and have a shoulder 21 near their open end designed to rest upon the body blank around the opening in the latter blank. The neck blanks have heads 22 in which certain dispensing openings and keeper elements are produced by operation of the machine. The cap blanks are generally circular in form (Fig. 29) and are designed to fit over the head of the neck blank, with the flanges 23 of the cap blanks surrounding the lateral walls of the neck blanks.

The means employed to feed the body blanks to position to be assembled with the neck blanks; to feed such assembled blanks to the press jaws and to fit the cap blanks to the press jaws comprises mechanism which is generally similar in its operation upon the different blanks, the mechanism being, however, different in parts in order to conform to the different shape of the blanks being fed. In the present embodiment the neck blanks are first assembled with the body blanks and the two blanks are fixed together, and advantage is taken of this fact, and a blank feeding mechanism employed which coöperates directly with the body blank to feed the same and therefore the neck blank is fed therewith.

A blank-feeding mechanism coöperates with each series of presses, and inasmuch as the two mechanisms are similar in many respects a description of one will suffice for both. Referring to the feed mechanism for the body and neck blanks, there is disposed at each side of the feed table 16 gripper jaw carriers 24 and 25 (Fig. 5) simultaneously reciprocal longitudinally of the feed table. On each carriage is a plurality of gripper jaws 26 and 27 reciprocal transversely of the direction of feed of the blanks, the gripper jaws of one carriage coöperating in pairs of those on the other. In this way the feed mechanism for each table and for the two series of presses comprises a plurality of sets of grippers which have simultaneous reciprocal movements of equal amplitude longitudinally of the path of feed and operate to translate the blanks from one press to another both into and out of position to be operated upon, the translating mechanism for the table 16 being provided with an additional pair of gripper jaws for translating the body blanks into position for reception of the neck blanks. The numerals 28 and 29 indicate rock shafts, preferably square in cross section, journaled in short standard bearings fastened to the bed frame 1 at each side of each of the tables. To each of the blank-translating gripper jaws 26 and 27 is pivotally joined a link 30, the ends of the links being pivotally connected by rods 31, and said rods in turn being pivotally connected to the ends of arms 32 on the rock shafts 28 and 29. As the shafts 28 and 29 are rocked, the arms 32 oscillate with the shafts and the grippers are thereby opened and closed. Inasmuch as the gripper jaw carriages move longitudinally of the table the connection between the rock arms 32 and the rock shafts 28 and 29 is such as to permit this movement and at the same time effect the opening and closing movement of the gripper jaws. In the present embodiment the rock shafts are square in cross section, the arms 32 being mounted thereon to rock therewith but being capable of movement longitudinally thereon. The carriages 24 and 25 are supported, in the present embodiment, by brackets or lugs 33 depending therefrom and through which the rock shafts pass, each lug being provided with a bushing 34 rotatively movable in the lug and having a square channel fitting the rock shafts. As illustrated, the inner sides of the carriages are supported upon the sides of the respective tables 15 and 16. The rock shafts 28 and 29 are rotated in opposite directions to effect the opening and closing movements of the blank translating gripping jaws, and in the present embodiment the rocking movement of these shafts are effected by imparting rocking movement to one shaft and from the latter effecting rocking movement of the other shafts. The numeral 35 indicates an arm which is fixed to the rock shaft 28 mounted adjacent the feed table 16, and 36 is a connecting rod pivoted to the arm 35 and adjustably pivotally connected to a rock lever 37 fulcrumed on a stationary portion of the machine, as at 38, and having a roller 39 coöperating with a cam 40 on the driving shaft 5. The numeral 41 indicates a spring operatively connected to the rock lever 37 and the frame to effect movement of the rock arm 37 in one direction, the cam 40 being arranged to positively effect the closing movement of the translatable gripper jaws. Each of the rock shafts extends rearwardly and has an arm 42 fixed thereto, and the arms 42 of the two rock shafts for the table 16 extend in opposite directions from each other as do the arms for the rock shafts adjacent the table 15. The numerals 43 and 44 indicate the connecting links between the oppositely extending arms respectively, and 45 indicates a link connecting an arm of a rock shaft operating in conjunction with one table to the arm of a rock shaft operating in conjunction with the other table. Thus as the rock shaft 28 is operated the other rock shafts are similarly operated in a proper direction to effect the opening and closing movements of the gripper jaws.

The gripper supporting carriages are given their reciprocal movements longitudinally of the feed tables through links 46 connected to each carriage and to arms 47 of a rock shaft 48 journaled in brackets extending from the sides of the bed frame 1. The shaft 48 is rocked through the instrumentality of an arm 49 to which one end of a link 50 is connected, the other end of said link being pivotally connected to a slide 51 vertically movable in a guideway 52 on one of the frame standards 3, and in turn pivotally connected by means of a link 53 to a rock lever 54 journaled on an axis 55 on the standard and in turn pivotally coupled to a strap of an eccentric 56 fixed to the driving shaft 5.

When the blanks are in position to be operated upon by the presses, they rest upon blank supporting means which are depressible so as to move transversely of the feed surface of the table into and out of initial blank supporting position. In their initial position they are substantially flush with the feed surface of the table. These blank supporting means, in the present embodiment, each consist of an annular plate 57 the central opening 58 in which is axially in line with the vertical axes of the coöperative press jaws or members. The downward movement of the press jaws operates upon the blanks resting upon the plates 57 and effects the depression of these plates so that they are movable with the blanks under the pressing operation. They are restored to their initial blank supporting position after being moved therefrom by means of a spring. In some of the presses this spring, which also yieldingly resists depression of these blank supporting members, is located in one place, and in others of the presses it is located at a different place. If reference be made to Fig. 7, which shows the construction of the press for affixing the neck blank to the body blank, the spring referred to will be seen at 59, being supported by a plate 60 on a stem 61 threaded into a block 62 forming a part of or securely fastened to a stationary portion of the feed table 16. The position of the plate 60 may be adjusted on the stem 61 through the instrumentality of the nuts threaded thereon, as illustrated. Depending from the blank supporting plate 57 are rods 63 which are guided in passageways 64 in the table frame, the lower ends of these rods coöperating with a plate 65 which is movable on the stem 61 and is urged upwardly by the spring 59. The initial position of the blank supporting plate 57 under the influence of the spring 59 may be defined by an annular stop plate 66 secured to the frame of the table and overhanging a shoulder on the blank supporting plate. As will be perceived, in several of the presses, the means for resisting the depression of the blank supporting plate, and for restoring it to initial position, is similar to the construction just described and repetition of the description thereof is unnecessary.

Alongside of the pathway of the blanks as they travel over the feed table 16 are devices to gage the position of the blanks transversely of the table relative to the axes of the presses, in the present embodiment comprising guide strips 67 and 68 at opposite sides of the table and overlying the blank supporting members. One of the important functions of the guide strips is to aline the blanks with the presses in a direction transversely of the table.

Figure 3:
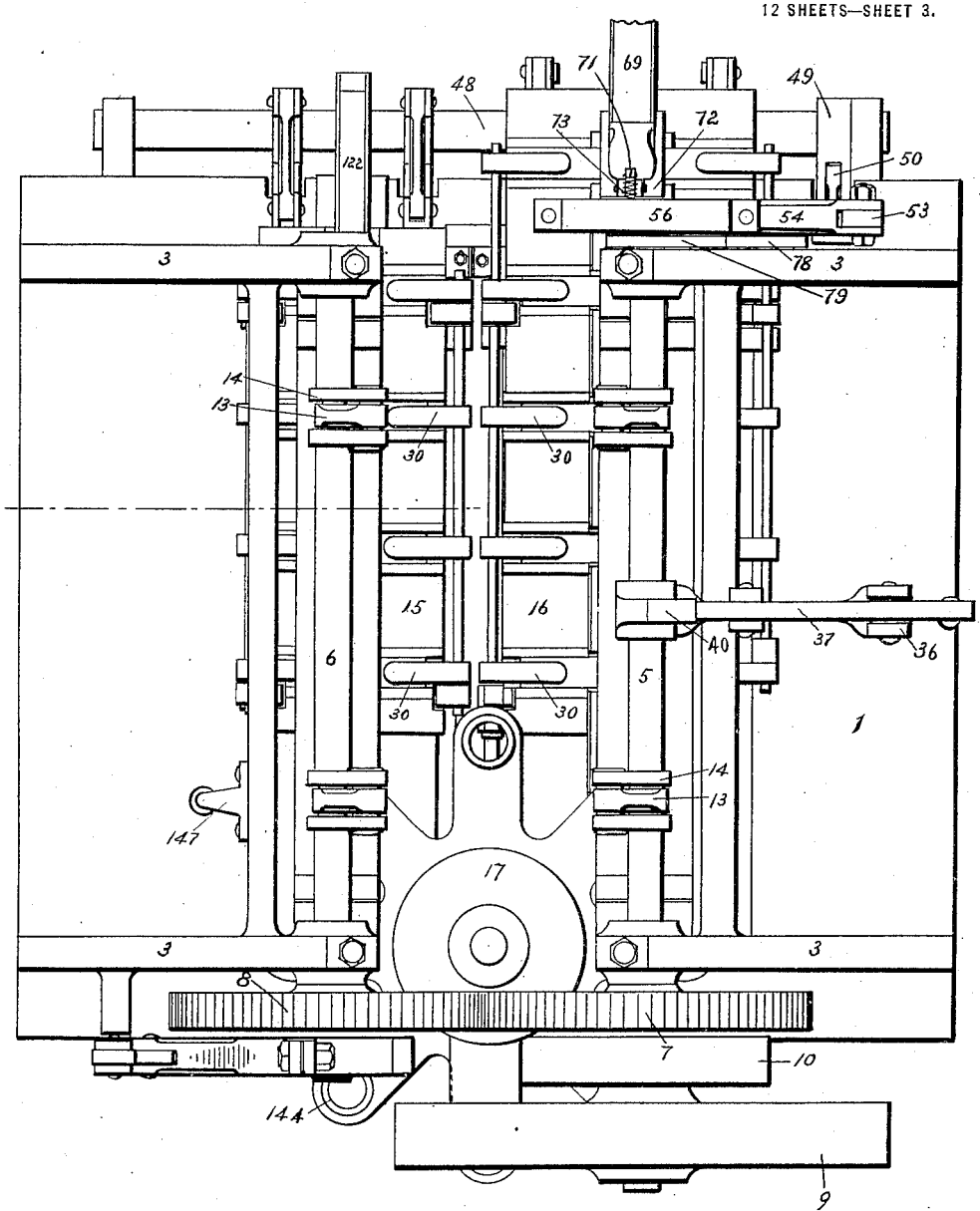
Fig. 3 is a plan view of the machine with some of the parts omitted for the sake of clearer disclosure.

Referring now to Figs. 3 and 4, the numeral 69 indicates a chute leading to the feed table 16 and along which the body blanks (Fig. 20) slide onto the feed table to position between the guides 67 and 68 into position for being gripped by the first pair of blank translating gripper jaws. This pair of jaws translates the blank to position in front of a second chute 70 (Fig. 1) from which neck blanks are delivered into the openings 18 in the body blanks. The gripper jaws 26 for the body blanks are generally elliptically shaped on their inner faces to correspond with the shape of the body blanks. As the blanks move into position between the jaws of the first pair of grippers, they may be arrested so as not to pass beyond the sphere of coöperation with said jaws by means of a body blank detent comprising a finger 71 (Figs. 3 and 36) pivoted on a cross piece 72 overhanging the grippers, a spring 73 being employed to urge the finger into the path of the body blank. As the body blank is drawn by the grippers from beneath the detent, the spring yields sufficiently to permit the finger to rise to clear the path of the blank.

The numeral 74 (Fig. 4) indicates a pusher having a curved jaw 75 adapted to coöperate with the lateral wall of a neck blank and urge the same along the chute 70 into position above the opening 18 in the body blank, with the open end of the neck blank within the opening in the body blank. Reciprocal movement is given the pusher 74 through the instrumentality of a link 76 (Fig. 1) pivoted to the pusher and to a rock lever 77, fulcrumed on the axis, or pin, 55, and having its upper end 78 coöperating with a cam 79 rotatable with the main shaft 5. The numeral 80 indicates a bracket carried by the neck blank chute and supporting a neck blank depresser which consists of a finger 81 spring pressed downwardly so as to force the open end of the neck into the opening 18 in the body blank. Thus as the pusher advances the neck blank, the edge of this blank enters the opening in the body blank and, should the complete edge of the neck blank not enter the opening, it will be forced thereinto by the depresser finger 81. The thus assembled neck blank and body blank will be translated by the second pair of gripper jaws to the press for affixing the two blanks together so as to hold them stationary relative to each other and prevent their separation.

Referring to Fig. 7, the coöperative parts of the press for affixing the body blank and neck blank together are disclosed in section at the right of the figure. The upper part comprises a press jaw 82, in this instance a female jaw in that it has an opening in which the neck blank and the lower jaw enter, the lower jaw including a post 83, having a portion 84 which fits within the tubular neck blank. Spaced from the blank receiving end of the post is a blank bending element, in the present embodiment a shoulder 85, the shoulder being shaped to bend the wall of the neck blank adjacent its open end around the edge of the opening in the body blank, as for instance, to the position illustrated in Fig. 26. The blank supporting member or plate 57 has the wall of its opening 58 around and transversely spaced from the blank fitting portion of the post. When the reciprocatory press jaw 82 descends, the neck blank enters the opening in this jaw until the jaw coöperates with the shoulder 21 on the neck blank, whereupon the neck blank descends together with the attached body blank and the depressible plate 57, the neck blank being received and supported by the reduced end of the post during the pressing operation. The lower edge of the wall of the neck blank encounters the shoulder 85 of the post, and will be bent outwardly to a sufficient extent to lie across the edge of the opening in the body blank, this upsetting of the neck blank resulting in the firm affixing of the two blanks together. The post 83 is firmly held to the frame of the machine with its upper end substantially flush with surface of the feed table, and may be slightly convex to fit the domed head 22 of the blank. Within the opening in the female jaw of the punch is disposed the head 86 of the blank ejector movable longitudinally in the jaw. This head is connected to a stem 87 extending axially of the press jaw and designed to be urged outwardly in a direction to eject the blank from the press jaw by an oscillatory ejector operator associated therewith. In the present embodiment the ejector operator comprises a lever arm 88, having a portion adapted to contact with the upper end of the ejector stem and another, or cam arm, 89, which latter may be operated to effect the ejecting movement as the press jaw rises. In the present embodiment the ejector operator lever is fulcrumed on the reciprocatory press head, as at 90, and the movement of this head away from its coöperative press element brings the ejector operator cam 89 into contact with a fixed member, as a bar 91, which effects the depression of the ejector arm 88. It is to be understood that the blank ejectors for all the presses are of the construction and operation just described.

At this point reference may be made to certain details of several of the presses, by reason of which their operation is secured and their dismemberment and their adjustment facilitated when required. The upper press jaw, as for instance, shown in Fig. 12, is removably carried in a sectional press jaw supporting block comprising sections 92, 93 and 94 and may be clamped between the sections 92 and 93 by means of the bolts 95. In the sections 92 and 94 are registering slots 96 and 97 through which pass bolts 98 to fasten the block in position in the reciprocatory head of the press. An adjusting screw of substantial structure is seated partly in the section 92 and partly in the section 94 and has a flanged head 99 and capstan openings 100, the latter provided for the insertion of an instrument to turn this screw to adjust the block vertically relative to the press head. In order that the rotation of this adjusting screw may effect vertical movement of the block in one direction or the other, the upper end of the screw coöperates with the portion of the press head opposite thereto to effect downward movement of the block and the flange 99 of the screw coöperates with the wall 101 of a slot in the press head to effect the upward movement of the block. In this wise the adjusting screw is prevented from any substantial longitudinal movement relative to the press head so that the rotation thereof effects the adjustment of the block and the press jaw carried thereby. As illustrated, the press jaws have cylindrical or slightly tapering upper portions 102 seated in counterpart recesses in the sections 92 and 93 and each is provided with a shoulder 103 to take the upward thrust of the press. In the present embodiment the press head comprises a series of partitions 104 between which the several sectional blocks are disposed for independent support and adjustment. The ejector operator arm 88 operates in a slot 105 in a forwardly extending web of the section 92, the end of this arm which coöperates with the ejector stem 87 playing in an opening 106 communicating with the slot just referred to. It is to be understood that the devices for holding all the upper press jaws and for adjusting the same are alike and similar to the construction just described.

From the affixing press the blank is carried by the tranlatable gripper jaws into position for the next operation which, in the present embodiment, is the operation of perforating the head of the neck blank so as to form dispensing openings therein, and at this point a movement limiting element is also formed on the head of the neck blank, this latter element being designed to coöperate with a movement limiting element formed on the cap blank, as will hereinafter appear. The elements of this press differ from those of the affixing press mainly by the presence of details for forming the perforations and the movement limiting element referred to. The blank ejecting devices and the blank supporting devices may be similar, and in the present embodiment are illustrated as similar to the portions employed in the affixing press. The numeral 107 indicates a reciprocatory press jaw of this second press, and in the opening 108 in this jaw is bolted a plate from which extend blank piercing punches 109, 109, which extend through a combined blank presser and ejector 110, which latter operates in the female jaw as does the ejector of the affixing press. The head of the ejector of this press, however, is provided with means for forming an element of a movement-limiting device, in the present instance a recess 111 which coöperates with a teat 112 on the coöperative male press element 113. Also the male portion has openings 114, 114, in line with the piercing punches. When the press jaw 107 descends, the neck blank enters this jaw and when the head of the neck blank encounters the ends of the punches 109, the affixed neck blank and body blank are pressed downwardly so that the post 113 of this press enters the neck blank and eventually the piercing punches will pass through said head, and the teat 112 and the recess 111 will coöperate to form a movement-limiting nib projecting upwardly from the head of the neck. In the latter operation the inner face of the head 110 of the ejector will coöperate with the end wall or plate 115 in the opening in the female jaw. In this perforating press the male press element is hollowed out to provide a passageway 116 for the scrap produced by the piercing punches and the spring supporting stem 61 has a passageway 117 through which the scrap may be discharged. It may be noted here that the teat 112 and coöperative recess are preferably of such dimensions as to form a nib which is somewhat larger cross-sectionally than need be in the finished nib. The operations of this press may leave rough edges of material and certain portions of the blank may not be of the precise dimension or shape desired. Moreover it is found that it conduces to the efficient accurate forming of certain parts of the blanks, as for instance, the nib referred to, to first make it in the rough of a different dimension from that desired, and subsequently reduce it. Loss due to imperfect blanks is found to be dispensed with in this way. Accordingly in the present embodiment it is preferred to pass the perforated and nibbed blank through a finishing operation in the nature of a compressing operation to smooth off rough edges and bring the nib to the size desired in the completed article. The next adjacent press may therefore be denominated the finishing press, and comprises two coöperative press jaws 118 and 119 having coöperating concave and convex opposing surfaces which are smooth and uninterrupted except for a nib finishing projection 120 on the one adapted to coöperate with the nib finishing recess 121 on the other. In this press the upper press jaw requires no ejector. As the press operates, raw edges of the head of the neck are finished off by compression and the nib resultant from the next adjacent press is reduced and compressed into the size desired in the finished article and so as to nicely coöperate with a movement-limiting slot in the cap, as will hereinafter appear.

Attention may now be directed to the operations to be performed upon the cap blanks (Figs. 29 and 30) whereby they are placed in condition for coöperative assembly with the neck blanks, nad especially with the affixed neck and body blanks.

Referring to Fig. 4, the numeral 122 indicates a chute down which the circular cap blanks slide on to the feed table 15 and into position between the first pair of cap blank gripper jaws of such table. A spring operated detent 123 is provided to yieldingly arrest the cap blanks in position to be gripped by the first pair of jaws. The coöperative end faces of these gripper jaws, as well as all the gripper jaws carried by the carriages 24 and 25 of this table 15 are circular in outline to conform to the blanks to be gripped. The cap blanks slide down the chute 122 and rest upon the table 15 with their open sides facing the table and the translatable movement of the cap gripper jaws feeds the cap blanks first into position opposite a press which forms openings 124 (Fig. 31) in the head of the cap blank adapted to register with the openings in the head of the neck blank and also forms a coöperative movement limiting element in the head of the cap blank, this element in the present embodiment being a curved slot 125 (Fig. 31) adapted to receive and coöperate with the nib formed on the head of the neck blank. Referring to Figs. 8 and 10, the perforating and slotting press for the cap blanks is shown in section at the right. This press is similar in many of its details to the perforating and nibbing press for the neck blank, differing therefrom, however, in that an extra punch 126 is carried within the opening in the upper press jaw to coöperate with an opening 127 in the lower press jaw to form the slot referred to. Also the springs which resist the depression of the blank supporting plate 57 surround the guide pins 63 carried by said plate, the construction being in this respect simplified over that of the other press referred to. In this press, as in the neck affixing and neck perforating and nibbing presses previously referred to, the upper end of the post 128 enters the cap and supports and braces it so that it may undergo the punching operations without becoming unduly distorted. The post 128 of this press is firmly removably secured to the bed frame, or to a block fastened thereto, and has a passageway 129 for the exit of scrap. The dispensing openings and the movement-limiting slot having been formed in the head of the blank by this press, any raw edges may be finished in the next press to which the cap translating gripper jaws convey the blank. The post or male element 130 of the finishing press is preferably solid to withstand the compressing operations in finishing, and its upper surface is slightly convex to correspond with a slight concavity in the face of the ejector head 131 of the upper press jaw. It is to be noted that the diameter of the flange portion of the cap blank is preferably measurably greater than that of the neck blank with which it is to be eventually assembled, and that the posts of the piercing and slotting press and the finishing press for the cap blanks are of a proper size to nicely fit within portions of the flange of the cap blank so as to press and support the same during operation thereon. The cap blank of the present embodiment is of quite thin metal and the vertical sides of the posts 128 and 130 are planed flat at opposite sides, as at 132 (Fig. 11). The openings in the depressible plates 57 fit these flat faced posts. In this wise the feed of the cap blanks over the posts is less apt to be impeded by the edges of the flanges of the cap blanks sinking into the joint between the posts and plates. It may be noted here that the depressible blank supporting members 57 both for the attached neck and body blanks and for the cap blanks serve as ejectors or strippers to remove the blanks from the several posts so as to permit them to be advanced by the translating mechanism from press to press.

Having been finished as set forth, the cap blank is fed by the translating mechanism to the next press (Figs. 8-11) which is to be regarded as having the required coöperative press jaws, ejector elements, etc., of the other presses. The lower coöperative jaw of this press, however, is smaller in diameter than that of the flange of the cap, and the blank supporting member 57 of this press comprises a die portion or element to bend the edge of the flange of the cap blank inwardly until the diameter of the opening bounded by the edge will be of a dimension to nicely fit the lateral wall of the neck blank. During this bending of the flange of the cap it will be positioned on the upper end of an abutment or post 133, serving to limit or gage the amount of bending just referred to. It will be observed that in this press the blank supporting member acts as well as a movable press jaw, the die portion thereof being comprised preferably in an annular curved or beveled wall 134 merging into the upper face of the supporting member or plate 57, the inner edge of the bevel nicely fitting the abutment 133. In order that the supporting plate 57 may coöperate to bend the cap flange, as referred to, means are provided to arrest the downward movement of this plate under the approaching movement of the press jaws and before completion of the approaching movement of such jaws. In the present embodiment this means consists in an annular stop member or shoulder 135, against which the lower face 136 of the blank supporting member may contact so as to be firmly held from further downward movement. The upper press jaw, however, continues to move down and thus the flange of the cap will be turned inwardly, as referred to, thereby providing a keeper element, in the present instance, an element in the nature of an annular groove 137 (Fig. 33) formed by the thus bent cap flange. In this press the cap supporting plate 57 is pressed upwardly and its downward movement resisted by springs 138 which are seated in recesses 139 and 140 in said plate and the base of this portion of the apparatus. The numeral 141 indicates a substantial screw which holds the abutment 133 firmly in position. The upper end of the post or abutment 133 may be convex to coöperate with the concavity in the ejector head for this press so as to slightly dome the cap blank as may be desired.

The cap blank, having been perforated, slotted and formed with the keeper element in its flange, as referred to, may be automatically assembled with the neck blank in such relation as to permit rotative adjustment of the cap blank relative to the neck blank, the movement-limiting elements coöperating to limit the amount of rotative adjustment normally permitted, and the keeper elements coöperating to retain the cap blank in coöperative relation with the neck blank so as not to become detached therefrom.

The operation of the several presses, as heretofore described, with especial reference to their detail features, provide neck blanks, body blanks and cap blanks in condition for efficient assembly, as just stated, and in the present embodiment such assembly is effected by instruments, including a press, associated with the table over which the neck blanks are fed, such press being illustrated in Fig. 7. The upper and reciprocatory member of this press comprises a press jaw 142 the end face of which is shaped to conform with the finished head of the cap and has a recess 143 for the easy reception of the nib of the head of the neck. No blank ejector is associated with this reciprocatory press jaw in the present embodiment. Coöperatively associated with the reciprocatory press jaw is a member 57 which supports the blanks in position to be operated upon by the press. Means are provided to transfer the cap blanks into coöperative relation with the body and neck blanks and to this end a cap positioning device is associated with the table 15 over which the cap blanks are fed. The numeral 144 indicates, generally, a cap blank gripper (Fig. 4), which is mounted in a cap carrier movable from a station opposite the cap blank feed table 15 to a position or station opposite the neck blank feed table 16. In the present embodiment the cap blank gripper comprises a plural arm device or roulette, each of the arms of which is provided with a gripper, and as the roulette rotates, the grippers are brought to rest opposite the positioning devices of the two tables just referred to so that a cap blank may be supplied to a gripper at one station and discharged therefrom at the other station. The cap positioning device comprises a circular recess 145 (Fig. 10) in the surface of the table 15 into which the caps are translated by the coöperative pairs of grippers 26 and 27. When lying in this recess the caps are accurately positioned relative to a cap moving and lifting plunger 146, the upper end of which readily enters the flange of the cap and lifts the same from the table onto the cap gripper jaw of the roulette which is then in stationary position opposite thereto. The plunger 146 may be pressed upwardly so as to transfer the cap into the grippers of the roulette by means of the reciprocatory head of the adjacent press, as illustrated, by means of a lug 147 (Fig. 5) fastened to said head and coöperating with the end of an upwardly projecting rod 148 guided in a sleeve 149 on the bed 1, the lower end of this rod being adjustably connected to one arm of a rock lever 150, the other arm of which is operatively connected to the lower end of the plunger 146. In the present embodiment as the cap is lifted by the reciprocatory member 146, it rests rather loosely thereon, and in order to assure that it shall assume a level position in the gripper of the roulette, a device consisting of a member 151 in the nature of a press jaw, and which may be connected to the press head as are the other press jaws, and which is of a size to enter between the jaws of the grippers of the roulette and come in contact with the head of the cap blank is employed. Conveniently, this leveling device may be mounted on the press head and partake of the reciprocations thereof as illustrated. Should the blank become disarranged on the plunger as by tilting thereon, the leveling device coöperates with the plunger to level the cap in the gripper and to define its position therein by limiting its movement thereinto.

Each arm of the roulette has an opening 152 and the face of each arm has an annular recess in which lie the stems 153 of a plurality of radially movable gripper jaws 154 pressed inwardly by means of a spring 155 coöperating with heads 156 on the outer end of each jaw. The lower ends of the gripper jaws may be beveled as at 157 for the easy reception of the cap blank therebetween and the grippers may be held in place so as to have slight radial movement sufficient to grip and ungrip the cap blanks by means of annular plates 158 bolted to the arms of the roulette. A cap blank, having been received from the table 15 in level position between the gripper jaws of an arm of the roulette, will be translated into position opposite the prepared neck blank on the table 16, whereupon the cap blank will be in the position to be discharged from the roulette gripper and assembled with the neck blank.

When the roulette has transferred a cap blank to position opposite the other table, an attached body and neck blank will have been translated into position on the supporting member 57 (Figs. 7 and 13) by the grippers 26 and 27 of table 16, the head of the neck blank lying above the opening 159 in the supporting member, the neck blank being thus positioned for the reception of the cap blank which latter, upon the descent of the press jaw 142 is discharged from the gripper of the roulette onto the neck blank, the press jaw closely following the cap blank to the neck blank and effecting thereafter the depression of both blanks and the consequent depression of the blank supporting plate 57 until that portion of the lateral wall of the neck blank opposite the keeper element or groove 137 formed in the cap blank arrives opposite certain keeper forming elements adapted to coöperate with such portion of the lateral wall of the neck blank to form a keeper element thereon which will coöperatively engage the keeper element of the cap blank. In this press the keeper forming element just referred to comprises a plurality of punch jaws 160 arranged in a circle and adapted to operate to expand the lateral wall of the neck blank so as to form a rib or ribs 161 (Fig. 34), or a complete annular rib thereon. The numerals 162 indicate the stems of these punch jaws, said stems resting upon a block 163 so as to tilt transversely of the direction of the approaching movement of the press jaw 142 to punch the blank, the keeper forming jaws 160 of this punch comprising beveled relatively blunt elements to operate upon the metal of the neck. At their lower parts, the stems 162 extend laterally as at 164 and have slots 165 for the reception of pins 166 to retain the stems in their circular relation to each other. Resting above the upper portion of the arms 164 is an annular plate 167 to retain the jaws in place, this plate being kept in position by screws 168. Some little play is allowed between the annular plate 167 and the arms 164 to permit the punch jaws to move readily in their keeper forming operation. Ordinarily a movement of 1/2000ths of an inch at this point is sufficient. In this press as in the others the blank supporting plate 57 is movable with the blanks, and in this instance also with the cap under the approaching movement of the jaws of the press; is resisted in its downward movement, and is restored to its initial supporting position by means of springs 169 encircling pins 170 connected to the plate 57 and guided in openings in the block 163, the latter being a part of the table. The numeral 171 indicates a wedge disposed between the punch jaws 160 and coöperating with inner inclined faces 172 of said jaws to move the punch jaws transversely of the direction of the approaching movement of the press jaw 142 to punch the blank. The stem 173 of this wedge has a threaded lower end on which are nuts 174 supporting a plate 175 with which the lower ends of the pins 170 coöperate to move the wedge downwardly to effect the keeper forming operation. As the body blank with its attached neck and the cap lying thereon are pressed downwardly by the jaw 142, the jaws 160 enter the tubular neck blank and the lower ends of the pins 170 approach the plate 175 without effecting punching operation of the jaws 160 until said lower ends contact with the plate 175 whereupon the wedge 171 will be moved through the instrumentality of the plate and stem and the keeper or rib 161 will be formed in the neck at a point to coöperate with the companion keeper previously formed upon the flange of the cap. Upon the rise of the press jaw 142 the plate 57 will strip the assembled blanks from the punch jaws and restore them to the level of the surface of the table, whereupon the next approaching attached neck and body blank will discharge the previously assembled blank from the machine, as for instance into a chute 176 (Fig. 7) which may lead to a suitable receptacle.

The numeral 177 (Figs. 1, 14) indicates a magazine in which a plurality of mass of neck blanks may be placed, and from which they may be automatically delivered to position in front of the neck pusher 74 for assembly with the body blanks. The numeral 178 indicates a passageway leading from the magazine to the chute of the neck feeding pusher. The numeral 179 indicates a selector wheel in the magazine and into coöperative relation with which the mass of blanks in the magazine gravitate as by inclining the lower wall of the magazine. The selector wheel has a series of peripheral recesses 180 which are so shaped as to permit the passage through each of a single neck blank only when the neck blank occupies a predetermined relation to the recess. In any other than such predetermined relation the neck blanks will not pass through the recesses. The numerals 181 indicate pins which coöperate with the blanks which have passed through the recesses 180 and move them through the circular passageway between the selector wheel and the end of the magazine to a position to enter the upper end of the channel 178 leading to the neck pusher. The selector wheel may be driven by any suitable means, as for instance by being coupled by means of a chain drive to the driving shaft 5 of the machine. A slotted block 181' is employed to assure that the blanks shall enter the passage 178.

The numeral 182 (Figs. 1, 17) indicates a second magazine in which the cap blanks may be placed *en masse*. In this magazine the selector wheel 183 comprises a plain surface in which annular recesses 184 are formed for the reception of the flanges 23 of the caps when the caps are disposed in predetermined position. The numeral 185 indicates a deflector which overlies the circular path of the annular recesses and permits the passage therebeneath of a cap blank when its flange is lying in one of the annular recesses in the selector wheel but prevents such passage when the cap blank is in some other position. The numeral 186 indicates a channel leading from the cap magazine to the chute 122 (Fig. 4) down which the cap blanks slide into position on the feed table 15. The numeral 187 indicates a guard or cover to prevent the cap blanks in the magazine from entering the channel 186 except by passing beneath the deflector 185. The selector wheel of the cap blank magazine may be operatively connected to one of the shafts, as 6, of the machine as by a belt drive or other efficient means. In the wheel 183, opposite each annular recess 184, plays an ejector pin 188 transversely of the face of the wheel 183, these pins in their inner position permitting the caps to seat themselves in the annular recesses 184 and pass beneath the deflector 185. Each pin 188 has a head 189, and a spring 190 coöperates with this head to effect inward movement of the pin. As the wheel 183 rotates, the caps which pass beneath the deflector are lifted from the recesses 184 by the pins 188, each pin coöperating with a cam 191 to lift a cap while such cap is in the chamber communicating with the passageway 186.

Any suitable means may be employed for effecting the intermittent rotary movement of the roulette to transfer the cap blanks from a position of rest opposite the cap positioning device, or station, to a position of rest opposite the neck positioning station. In the present embodiment the intermittent movement referred to is effected by means of a pawl 192 (Fig. 4) pivoted to an arm 193 journaled on the shaft 194 to which the roulette is coupled for rotary movement, the intermittent movement of said arm 193 being effected through the instrumentality of a connecting rod 195 having universal pivotal connection with one end of a rock lever 196, the other end of said lever being pivoted to a strap 197 of an eccentric 198 on the shaft 6 at the rear of the machine. The numeral 199 indicates a spring coöperating with the pawl 192 and with an abutment 200 carried by the arm 193 to press the pawl into the teeth of the ratchet wheel 201 fastened to the shaft 194 of the roulette. Retrograde movement of the ratchet wheel in the one direction is prevented by a spring operated pawl 202 and retrograde movement in the opposite direction may be prevented by a spring operated pawl 203 adapted to enter the teeth of the ratchet wheel, this pawl having a tail piece 204 with which coöperates a cam or tappet 205 carried by the arm 193. When the connecting rod 195 is moved in a direction to turn the ratchet wheel in a direction to rotate the roulette in a blank feeding direction, the tappet 205 coöperates with an incline or cam face 206 of the tail piece 204 and permits the pawl 203 to enter the teeth of the ratchet wheel. On movement of the connecting rod in the opposite direction the operating pawl will be deflected from the teeth of the ratchet wheel and the tappet 205 will coöperate with the tail piece 204 to remove the pawl 203 from the ratchet wheel so that upon the reverse movement of the connecting rod another rotating movement of the roulette may be effected.

The operation of the machine will be understood from the foregoing description but may be described as follows:

The different kinds of blanks may be supplied to the chutes 69, 70 and 122 by an attendant, or the neck blanks and the cap blanks may be automatically supplied synchronously with the operation of the machine by the selector devices operating in conjunction with the magazines 177 and 182, as explained. A body blank will assume position on the feed table 16 with its concave side down, the edge of this blank resting upon the table between the first pair of gripper jaws 26 and 27. A cap blank will rest with its edge upon the table 15 in position to be grasped by the first pair of cap gripper jaws 26 and 27. Each blank will be carried by one or the other pairs of the gripper jaws adjacent the respective tables into and out of position where it will coöperate with the respective presses, and the body blank will as well be carried into position where the neck blank will be assembled therewith by the neck pushing device. Eventually the body blank with the neck blank affixed thereto will arrive in coöperative relationship with the last press which, in the present embodiment, is that employed for assembling the cap blank with the neck blank, and the neck blank will here be positioned to receive the cap, which latter will be transferred in position thereover by the roulette, the cap blank having been transferred to the roulette by the vertical reciprocating plunger 146. The perforating, nibbing and keeper forming elements of the series of presses adjoining the feed table 16 and operating upon the neck blank will be set in a predetermined relation to the perforating, slot forming, and keeper forming presses operating in conjunction with the feed table 15, and the cap blanks thereon, and during the feed of the different kinds of blanks over their respective tables, and during operation of the presses on the different kinds of blanks, the rotary relation between the neck blanks and the cap blanks will not be changed. In this wise the complementary portions of the different kinds of blanks, such as the perforations, the keeper elements, and the nib and slot, or movement-limiting elements, will retain a predetermined relation during their passage through the machine so that this relationship may be depended upon and the one kind of blank assembled with the other kind with the assurance that the complementary portions of each will register. In the present embodiment the predetermined relation of the tools for operating on the different kinds of blanks is such that the transfer device, or roulette, when it positions the cap blanks above the body blanks, as well alines the nib on the head of the neck with the slot in the cap so that these movement-limiting elements will immediately engage each other in operative relationship upon assembly of the blanks. So also the keeper element of the cap is so disposed relative to the keeper forming element for the neck that the keeper formed on the neck will operatively register with the cap keeper element as soon as formed. The perforating tools for the cap and neck are disposed to form openings which will aline preferably when the cap is first assembled with the neck, as above described. By the provision of the series of translatable pairs of grippers for the different kinds of blanks, each pair having the same amplitude of reciprocation, the blanks are simultaneously fed the same distance at each movement so that the coöperative press jaws may operate thereon at accurate predetermined points. Preferably, the timing of the gripping of the blanks by the jaws 26 and 27 relative to the, as it were, gripping thereof by the press elements, is such that these feeding grippers do not release the blanks until the press elements have taken hold thereof, and thereafter the press elements do not release the blanks until the feeding grippers again take hold thereof. Thus practically throughout the travel of the blanks they are held in predetermined position relative to each other. The feed tables over which the blanks travel are illustrated as composed of a block or casting of substantial construction having chambers 207 in which certain of the press elements lie. In this wise the press elements may be readily removed and replaced, if desired. Or these tables might be composed of a series of abutted blocks fastened to the table and containing the press elements referred to.

By the foregoing construction, blanks of concave form, such as exemplified in Figs. 20, 22 and 29 and composed of quite thin sheet metal, having a finished surface, as by enameling, may be automatically operated upon, as described, and assembled together without defacing the enamel surfaces and without distorting the blanks at unintended places.

The machine provides an automatic device for carrying out an improved method or process of operating on blanks and assembling them in predetermined relation to each other, the more important steps of which will be understood as explained in conjunction with the operations of the machine itself, as will appear from the foregoing and what follows. By first assembling the neck blanks with the body blanks, and thereafter perforating and nibbing, or otherwise bending the head of the neck blank, it follows that during the perforating and bending operations the body blank is supported and leveled but without being subjected to the effective pressure required to perforate and bend the neck blank. In this wise the body blank retains its original shape and finish notwithstanding the relatively heavy pressures required to operate effectively upon the head of the neck. Furthermore it will be observed that the keeper elements are formed in the flange of the cap blank before assembly with the neck blank and are formed in the neck blank after assembly with the body blank. In this wise the spreading of one of these blanks, and the possible distortion due to such spreading, in order to place the keeper elements in coöperative complementary relation should such elements be formed before assembly, is avoided.

Also the machine provides means for automatically assembling tubular blanks, such as, especially, the neck blanks and the cap blanks hereinbefore described, and bringing certain parts of such different kinds of blanks into coöperative relationship, as, for instance, the two coöperative movement-limiting elements, exemplified by the nib and slot of the present blanks. In the present instance these blanks are circular circumferentially and are relatively light in weight, and the automatic control thereof may not ordinarily be easily effected. It will be seen that notwithstanding the neck blanks and cap blanks are moved through the machine to undergo various operations, control of the position of these blanks is effectively maintained so that certain parts thereof will be found in a predetermined position at a predetermined place in the machine or in space. For instance, the press which produces the nib in the head of the neck blank provides such nib at a predetermined point around the longitudinal axis of this blank and so that the nib occupies a predetermined position in space relatively around such axis. So the press that provides the slot in the cap blank produces it at a relatively predetermined point in space around the longitudinal axis thereof. The relation of these two presses and the nibbing and slotting tools thereof also assures that the positions of the slots and the nibs around the longitudinal axes of the respective blanks will have a predetermined relation to each other so that the definitely operating assembly mechanism may be relied upon to effect coöperative relation of the nib of one blank with the slot of the other by the mere act of assembly. The fact that the blanks of the present embodiment are tubular makes for accuracy of registry of the complemental portions thereof, the machine operating to telescopically assemble these blanks so that one is guided on the other, as it were. The grippers of the roulette may be made to pass quite close to the cap blank about to be lifted thereinto, and as the plunger or lifter 146 is designed to have plenty of clearance relative to the flange of the cap but a broad blank supporting surface, the cap may be lifted without horizontal rotation and without tilting. Once in the gripper of the roulette the caps are restrained from such rotation by the grasp of the gripper so that the slots in these blanks may and will be accurately placed relative to the nibs on the heads of the neck blanks. The slot is longer circularly than the nib, so that some margin of movement is permissive in any event. In the embodiment illustrated the positions of the respective movement-limiting elements of the different kind of blanks are such that a movement of one blank around its longitudinal axis will bring the movement-limiting element thereof into relation in space with its axis, similar to the relation in space of the movement-limiting element of the complemental blank with relation to its (the complemental blank's) axis. In this manner a transfer device, of an efficient and simple character, may be utilized, this transfer device operating to bring the complemental movement - limiting elements into alinement preparatory to final assembly, and yet without rotary movement of either blank around its longitudinal axis. It will be noted that when the movement-limiting elements of the two different blanks have assumed coöperative relation, the pressing mechanism restrains rotary movement between the assembled blanks, so that the movement-limiting elements are maintained in coöperative relation after it has once been attained.

It will be observed that the feed tables for the blanks and the presses respectively coöperative therewith are arranged side by side, the standards 3 extending from opposite sides or edges of the bed frame 1 and having portions extending toward each other and over the bed frame and the respective tables. In this wise the frames or framework of the presses above the bed frame 1 face outwardly, as it were, so that the operative parts of the machine, especially the presses face each other. This arrangement enables the length of the machine to be shortened as compared with an arrangement where one series of presses is arranged in line with another series, and it also serves to protect the structure, in that most of the special operating parts are disposed between the standards 3 rising from opposite sides of the bed frame 1.

Thus by the above described construction are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language might be said to fall therebetween.

Having described our invention, what we claim as new and desire to secure by Letters Patent is:

1. In an apparatus of the character described, in combination, means adapted to dispose a tubular blank having a movement limiting element so that said movement limiting element occupies a predetermined position in space around the longitudinal axis of said blank, comprising guides between which the blank is adapted to move and a blank gripper adapted to translate the blank between said guides, and means adapted to assemble another tubular blank, having a movement limiting element, in telescopic relation to said first-mentioned blank with the movement limiting elements of said blanks in coöperative relation.

2. In an apparatus of the character described, in combination, means adapted to dispose a tubular blank having a movement limiting element so that said movement limiting element occupies a predetermined position in space around the longitudinal axis of said blank, and means adapted to assemble another tubular blank, having a movement limiting element, in telescopic relation to said first-mentioned blank with the movement limiting elements of said blanks in coöperative relation, comprising a movable blank transfer device adapted to hold the blank from rotation on its longitudinal axis.

3. In an apparatus of the character described, in combination, means adapted to dispose a tubular blank having a movement limiting element so that said movement limiting element occupies a predetermined position in space around the longitudinal axis of said blank, means adapted to assemble another tubular blank, having a movement limiting element, in telescopic relation to said first-mentioned blank with the movement limiting elements of said blanks in coöperative relation, comprising a movable blank transfer device adapted to hold the blank from rotation on its longitudinal axis, a table on which the blank is adapted to rest, and means adapted to move the blank from the table into coöperative relation with said transfer device.

4. In an apparatus of the character described, in combination, means adapted to dispose a tubular blank having a movement limiting element so that said movement limiting element occupies a predetermined position in space around the longitudinal axis of said blank, means adapted to assemble another tubular blank, having a movement limiting element, in telescopic relation to said first-mentioned blank with the movement limiting elements of said blanks in coöperative relation, comprising a movable blank transfer device adapted to hold the blank from rotation on its longitudinal axis, and a press jaw operative across the path of movement of said transfer device to effect discharge of the blank from the latter onto said first-mentioned blank.

5. In an apparatus of the character described, in combination, means adapted to dispose a tubular blank having a movement limiting element so that said movement limiting element occupies a predetermined position in space around the longitudinal axis of said blank, means adapted to assemble another tubular blank, having a movement limiting element, in telescopic relation to said first-mentioned blank with the movement limiting elements of said blanks in coöperative relation, comprising a movable blank transfer device adapted to hold the blank from rotation on its longitudinal axis, a table on which the blank is adapted to rest, means adapted to move the blank from the table into coöperative relation with said transfer device, and a press jaw operative across the path of movement of said transfer device to effect discharge of the blank from the latter onto said first-mentioned blank.

6. In an apparatus of the character described, in combination, means adapted to provide a tubular blank with a movement limiting element at a predetermined point around the longitudinal axis of said blank, and means adapted to telescopically assemble said blank with another tubular blank, comprising means adapted to hold said first-mentioned blank from substantial rotation around said axis during said assembly.

7. In an apparatus of the character described, in combination, means adapted to provide a tubular blank with a movement limiting element at a predetermined point around the longitudinal axis of said blank, means adapted to telescopically assemble said blank with another tubular blank, comprising means adapted to hold said first-mentioned blank from substantial rotation around said axis, and means adapted to hold said other blank from rotation around its longitudinal axis during said assembly.

8. In an apparatus of the character described, in combination, means adapted to provide a tubular blank with a movement limiting element at a predetermined point around the longitudinal axis of said blank, and means adapted to telescopically assemble said blank with another tubular blank, comprising means adapted to hold said first-mentioned blank from substantial rotation around said axis during said assembly, said holding means comprising a pair of coöperative gripper jaws.

9. In an apparatus of the character described, in combination, means adapted to provide a tubular blank with a movement limiting element at a predetermined point around the longitudinal axis of said blank, means adapted to telescopically assemble said blank with another tubular blank, comprising means adapted to hold said first-mentioned blank from substantial rotation around said axis, and means adapted to hold said other blank from rotation around its longitudinal axis during said assembly, said last-mentioned means comprising a blank gripper movable into and out of position in axial alinement with the other blank.

10. In an apparatus of the character described, in combination, means adapted to provide two tubular blanks with movement limiting elements at points around the longitudinal axes of the blanks having predetermined relation to each other, and means adapted to assemble said blanks in telescopic relation to each other and cause said movement limiting elements to assume coöperative relation to each other.

11. In an apparatus of the character described, in combination, means adapted to assemble two tubular blanks having movement limiting elements comprising means adapted to move one blank into telescopic assembly relation with the other, and means adapted to restrain each blank from rotation on its longitudinal axis during said assembly movement.

12. In an apparatus of the character described, in combination, means adapted to provide two tubular blanks with movement limiting elements at points around the longitudinal axes of the blanks having such relation to each other that a rotary movement of one blank or the other around its said axis will bring the movement limiting element thereof into relation in space with its axis substantially similar to the relation in space of the movement limiting element of the other blank with relation to the latter's said axis, and means adapted to assemble said blanks with said movement limiting elements in coöperative relation without rotation of said blanks on said axes.

13. In an apparatus of the character described, in combination, means adapted to provide two tubular blanks with movement limiting elements, at points around the longitudinal axes of the blanks, having such relation to each other that a rotary movement of one blank or the other around its said axis will bring the movement limiting element thereof into relation in space with its axis substantially similar to the relation in space of the movement limiting element of the other blank with relation to the latter's said axis, means adapted to move one of said blanks into telescopic relation to the other and cause the movement limiting element of one blank to coöperatively engage the movement limiting element of the other blank, and means adapted to restrain each blank from rotation on its longitudinal axis during said last-mentioned movement.

14. In an apparatus of the character described, in combination, means adapted to feed a neck blank, means adapted to feed a cap blank, means adapted to feed a body blank, means adapted to assemble a neck blank in an opening in the body blank and affix the two blanks together, and means adapted to assemble a cap blank in coöperative relation with said affixed blank.

15. In an apparatus of the character described, in combination, means adapted to feed a neck blank, means adapted to feed a body cap blank, means adapted to assemble a neck blank in an opening in the body blank and affix the two blanks together, means adapted to assemble a cap blank in coöperative relation with said affixed blanks, means adapted to operate on respective masses of neck blanks and cap blanks to deliver such blanks to the assembly means in certain predetermined relation to each other, and a chute adapted to conduct body blanks into predetermined relation to the delivered neck blanks.

16. In an apparatus of the character described, in combination, means adapted to assemble in coöperative relation a neck blank and a cap blank, and means adapted to provide said blanks with keeper elements to retain them in coöperative relation and permit adjusting movement of one relative to the other.

17. In an apparatus of the character described, in combination, means adapted to assemble in coöperative relation a neck blank and a cap blank, means adapted to provide said blanks with keeper elements to retain them in coöperative relation and permit adjusting movement of one relative to the other, and means to provide said blanks with means to limit the amount of adjusting movement.

18. In an apparatus of the character described, in combination, means adapted to assemble in coöperative relation a neck blank and a cap blank, means adapted to provide said blanks with keeper elements to retain them in coöperative relation and permit adjusting movement of one relative to the other, and mechanism disposed to operate on one kind of said blanks and form a dispensing opening therein before it is assembled with the other blank.

19. In an apparatus of the character described, in combination, means adapted to assemble in coöperative relation a neck blank and a cap blank, and means adapted to provide said blanks with keeper elements to retain them in coöperative relation and permit adjusting movement of one relative to the other, comprising mechanism adapted to form a keeper element in one kind of said blanks before they are assembled.

20. In an apparatus of the character described, in combination, means adapted to assemble in coöperative relation a neck blank and a cap blank, means adapted to provide said blanks with keeper elements to retain them in coöperative relation and permit adjusting movement of one relative to the other, comprising mechanism adapted to form a keeper element in one kind of said blanks before they are assembled, and mechanism adapted to form a keeper element in the other kind of said blanks after they are assembled.

21. In an apparatus of the character described, in combination, means adapted to assemble in coöperative relation a neck blank and a cap blank, means adapted to provide said blanks with keeper elements to retain them in coöperative relation and permit adjusting movement of one relative to the other, mechanism disposed to operate on both kinds of said blanks and form dispensing openings therein before they are assembled, said second mentioned means comprising mechanism adapted to form a keeper element on one kind of said blanks before they are assembled, and mechanism adapted to form a keeper element on the other kind of said blanks after they are assembled.

22. In an apparatus of the character described, in combination, mechanism adapted to assemble a neck blank in an opening in a body blank and affix the blanks together, and mechanism adapted to assemble a cap in coöperative relation with the neck of said affixed blanks, said affixing mechanism comprising a press adapted to bend the wall of the neck blank across the edge of the opening in the body blank.

23. In a machine of the class described, in combination, a neck positioning device, a cap positioning device, and means adapted to transfer one of said parts from one device into assembly relation with the other part, comprising a gripper, means adapted to move said gripper and bring it to rest opposite each of said positioning devices, means adapted to move said cap into said gripper at one position of rest of the latter, and means adapted to move said cap from said gripper onto the neck at the other position of rest of said gripper.

24. In a machine of the class described, in combination, a neck positioning device, a cap positioning device, means adapted to transfer one of said parts from one device into assembly relation with the other part, comprising a gripper, means adapted to move said gripper and bring it to rest opposite each of said positioning devices, means adapted to move said cap into said gripper at one position of rest of the latter, means adapted to move said cap from said gripper onto the neck at the other position of rest of said gripper, and means adapted to coöperate with said first-mentioned cap moving means to level the cap in the gripper.

25. In a machine of the class described, in combination, a neck positioning device, a cap positioning device, means adapted to transfer one of said parts from one device into assembly relation with the other part, comprising a gripper, means adapted to move said gripper and bring it to rest opposite each of said positioning devices, means adapted to move said cap into said gripper at one position of rest of the latter, comprising a reciprocatory member adapted to enter said cap, and means adapted to move said cap from said gripper onto the neck at the other position of rest of said gripper.

26. In a machine of the class described, in combination, a neck positioning device, a cap positioning device, means adapted to transfer one of said parts from one device into assembly relation with the other part, comprising a gripper, means adapted to move said gripper and bring it to rest opposite each of said positioning devices, means adapted to move said cap into said gripper at one position of rest of the latter, comprising a reciprocatory member adapted to enter said cap, means adapted to move said cap from said gripper onto the neck at the other position of rest of said gripper, a reciprocatory press member disposed to operate on the cap before the latter is moved by said reciprocatory member, and means moved by said press member adapted to operate said reciprocatory member to move the cap into said gripper.

27. In a machine of the class described, in combination, a neck positioning device, a cap positioning device, means adapted to transfer one of said parts from one device into assembly relation with the other part comprising a gripper, means adapted to move said gripper and bring it to rest opposite each of said positioning devices, means adapted to move said cap into said gripper at one position of rest of the latter, comprising a reciprocatory member adapted to enter said cap, means adapted to move said cap from said gripper onto the neck at the other position of rest of said gripper, means adapted to coöperate with said first-mentioned cap moving means to level the cap in the gripper, a reciprocatory press member disposed to operate on the cap before the latter is moved by said reciprocatory member, and means moved by said press member adapted to operate said reciprocatory member to move the cap into said gripper, said leveling means being carried by said press member.

28. In a machine of the class described, in combination, means adapted to provide the flange of a cap with an element of a keeper, a cap positioning device, a neck positioning device comprising a depressible neck support having an opening, a cap carrier movable from a station opposite one of said devices to a station opposite the other, a reciprocatory member adapted to enter said cap and move it to said carrier at the cap positioning station, a punch opposite said opening adapted to operate on the lateral wall of the neck to form a keeper element adapted to coöperate with the keeper element of the cap to retain the cap on the neck, means whereby the depression of said support operates said punch, and a reciprocatory press member adapted to discharge said cap from said carrier onto said neck and through said cap and neck effect the depression of said support.

29. In an apparatus of the character described, in combination, coöperative press elements adapted to operate on a blank disposed therebetween, one of said elements comprising a sectional press jaw supporting block, one of said sections having a slot, an adjusting screw seated partly in one section and partly in said slotted section, a frame piece on which said block is disposed, a bolt passing through said sections and slot adapted, upon being set up, to fasten the block to said frame piece, and means carried by said frame piece adapted to engage said screw and prevent longitudinal movement thereof relative to said frame piece.

30. In an apparatus of the character described, in combination, coöperative press elements adapted to operate on a blank disposed therebetween, one of said elements comprising a sectional press jaw supporting block, a press jaw between sections of said block, means adapted to clamp said last-mentioned sections together to grip said jaw, an ejector longitudinally movable in said jaw, an oscillatory ejector operator carried by said block, means adapted to reciprocate the press element carrying said block, and means whereby, upon movement of the latter press element away from said other press element, said ejector operator causes said ejector to move relative to said jaw to eject a blank therein.

31. In an apparatus of the character described, in combination, coöperative press jaws, means adapted to cause relative approaching and receding movements between said jaws, one of said jaws comprising a post adapted to fit within a tubular blank, said post having a shoulder spaced from its blank receiving end, a movable member around said post and transversely spaced from the blank fitting portion thereof adapted to support a blank in position to be operated on by said jaws, and a spring to move said member to initial blank supporting positions and resist movement therefrom.

32. In an apparatus of the character described, in combination, coöperative press jaws, means adapted to cause relative approaching and receding movements between said jaws, one of said jaws comprising a post adapted to fit within a tubular blank, said post having a shoulder spaced from its blank receiving end, a movable member around said post and transversely spaced from the blank fitting portion thereof adapted to support a blank in position to be operated on by said jaws, a spring to move said member to initial blank supporting position, and resist movement therefrom, and means adapted to define the initial position assumed by said member under the influence of said spring.

33. In an apparatus of the character described, in combination, coöperative press jaws, means adapted to cause relative approaching and receding movements between said jaws and a member adapted to support a blank in position to be operated on by said jaws, said jaws comprising male and female portions, respectively, adapted to receive and support the blank during the pressing operation, blank piercing punches disposed in the opening in said female portion, a combined blank ejector and presser operative in said female portion and through which said punches are adapted to extend, said male portion having openings adapted to coöperate with said punches, and a teat adapted to coöperate with said presser.

34. In an apparatus of the character described, in combination, coöperative press jaws, means adapted to cause relative approaching and receding movements between said jaws, and a member adapted to support a blank in position to be operated on by said jaws, said jaws comprising male and female portions, respectively, adapted to receive and support the blank during the pressing operation, blank piercing punches disposed in the opening in said female portion, a combined blank ejector and presser operative in said female portion and through which said punches are adapted to extend, said male portion having openings adapted to coöperate with said punches, a teat adapted to coöperate with said presser, and a scrap passageway communicating with said openings in said male portion.

35. In an apparatus of the character described, in combination, a press jaw, a punch-jaw, means adapted to cause relative approaching and receding movements between said jaws, a member adapted to support a blank in position to be operated on by said jaws, said member being movable with the blank under the approaching movement of said jaws, means adapted to restore said member to initial blank supporting position after being moved therefrom, said punch jaw being movable transversely of the direction of said approaching movement to punch said blank.

36. In an apparatus of the character described, in combination, a press jaw, a punch, jaw, means adapted to cause relative approaching and receding movements between said jaws, a member adapted to support a blank in position to be operated on by said jaws, said member being movable with the blank under the approaching movement of said jaws, means adapted to restore said member to initial blank supporting position after being moved therefrom, said punch jaw being movable transversely of the direction of said approaching movement to punch said blank, and means whereby the movement of said blank supporting member under the said approaching movement effects said transverse movement of the punch jaw.

37. In an apparatus of the character described, in combination, a press jaw, a punch comprising a plurality of punch jaws adapted to enter a tubular blank, means adapted to cause relative approaching and receding movements between said press jaws and said punch jaws, a movable member around said plurality of punch jaws adapted to support a blank in position to be operated on by said jaws, a wedge adapted to move said punch jaws transversely of the direction of said approaching movement to punch said blank, and coöperative means whereby the movement of said movable member operates said wedge.

38. In an apparatus of the character described, in combination, coöperative press jaws, means adapted to cause relative approaching and receding movements between said jaws, one of said jaws comprising a movable member adapted to support a cap blank in position to be operated on and having a die portion adapted to bend the edge of said blank, and means adapted to arrest the movement of said blank supporting member under said approaching movement before the completion of said approaching movement.

39. In an apparatus of the character described, in combination, coöperative press jaws, means adapted to cause relative approaching and receding movements between said jaws, one of said jaws comprising a movable member adapted to support a cap blank in position to be operated on and having a die portion adapted to bend the edge of said blank, means adapted to arrest the movement of said blank supporting member under said approaching movement before the completion of said approaching movement, and an abutment adapted to limit the amount of bending of said blank by said die.

40. In an apparatus of the character described, in combination, a series of presses adapted to perform operations on blanks, and a feed table along which the blanks travel from one press to another, said table comprising members adapted to support the blanks in position to be operated on by said presses, respectively, means adapted to move the blanks from one member to another, said members being movable transversely of the feed surface of the table into and out of blank-receiving position flush with the feed surface of said table, and said blank feed means comprising a plurality of sets of grippers having simultaneous reciprocal movements of equal amplitude.

41. In an apparatus of the character described, in combination, a series of presses adapted to perform operations on blanks, and a feed table along which the blanks travel from one press to another, said table comprising members adapted to support the blanks in position to be operated on by said presses, respectively, means adapted to move the blanks from one member to another, said members being movable transversely of the feed surface of the table into and out of blank-receiving position flush with the feed surface of the table, and said blank feed means comprising a plurality of gripper jaw carriages reciprocal longitudinally of the table, a plurality of gripper jaws on each carriage reciprocal relative to said carriage transversely of the direction of feed, the gripper jaws of one carriage coöperating in pairs with those on the other.

42. In an apparatus of the character described, in combination, a series of presses adapted to perform operations on blanks, a feed table along which the blanks travel from one press to another, said table comprising members adapted to support the blanks in position to be operated on by said presses, respectively, means adapted to support said members and permit them to move transversely of the feed surface of the table into and out of blank-receiving position, and means adapted to feed blanks from one supporting member to another comprising a plurality of gripper jaw carriages, one at each side of the table, simultaneously reciprocal longitudinally of the table, a plurality of gripper jaws on each carriage reciprocal on the respective carriages transversely of the direction of feed, the jaws of one carriage adapted to coöperate with those of the other, respectively, to grip blanks.

43. In an apparatus of the character described, in combination, a series of presses adapted to perform operations on blanks, a feed table along which the blanks travel from one press to another, said table comprising members adapted to support the blanks in position to be operated on by said presses, respectively, means adapted to support said members and permit them to move transversely of the feed surface of the table into and out of blank-receiving position, means adapted to feed blanks from one supporting member to another comprising a plurality of gripper jaw carriages, one at each side of the table, simultaneously reciprocal longitudinally of the table, a plurality of gripper jaws on each carriage reciprocal transversely of the direction of feed, the jaws of one carriage adapted to coöperate with those of the other, respectively, to grip blanks, a plurality of rock shafts, connections between said respective shafts and gripper jaws to open and close the latter as said shafts are rocked, and means to rock said shafts.

44. In an apparatus of the character described, in combination, a series of presses adapted to perform operations on blanks, a feed table along which the blanks travel from one press to another, said table comprising members adapted to support the blanks in position to be operated on by said presses, respectively, means adapted to support said members and permit them to move transversely of the feed surface of the table into and out of blank-receiving position, means adapted to feed blanks from one supporting member to another comprising a plurality of gripper jaw carriages, one at each side of the table, simultaneously reciprocal longitudinally of the table, a plurality of gripper jaws on each carriage reciprocal transversely of the direction of feed, the jaws of one carriage adapted to coöperate with those of the other, respectively, to grip blanks, a plurality of rock shafts, connections between said respective shafts and gripper jaws to open and close the latter as said shafts are rocked, means to rock said shafts, said connections comprising links connected to said gripper jaws, rods connecting said links, and arms on said shafts connected to said rods.

45. In an apparatus of the character described, in combination, a plurality of series of presses adapted to perform operations on blanks, feed tables along which the blanks travel from one press to another in each series, respectively, said tables comprising members adapted to support the blanks in position to be operated on by said presses, respectively, and permit them to move transversely of the feed surface of the table into and out of blank-receiving position, and means adapted to feed blanks from one supporting member to another on said respective tables, comprising a plurality of gripper jaw carriages, one at each side of each table, simultaneously reciprocal longitudinally of the respective tables, a plurality of gripper jaws on each carriage reciprocal transversely of the direction of feed, the jaws of the carriages of each table being adapted to coöperate one with another, respectively, to grip and release blanks, a plurality of rock shafts, connections between said respective shafts and gripper jaws to open and close the latter as said shafts are rocked, means adapted to rock one of said shafts, means operatively connected to said last-mentioned shaft and the said other shafts to rock the latter shafts with the former, a carriage operating rock shaft, and arms and links connecting said last-mentioned rock shaft and the respective carriages for simultaneous reciprocation of said carriages.

46. In an apparatus of the character described, in combination, a series of punches adapted to operate on blanks, simultaneously translatable pairs of grippers adapted to move blanks into and out of position to be operated on by said presses, a feed table along which the blanks travel into position to be operated on by said presses, guides to aline the blanks with said presses, means adapted to deliver a body blank having a neck-receiving opening onto said table between said guides, and means adapted to deliver a tubular neck blank with its edge into said opening in the body blank.

47. The method of assembling a cap blank and a neck blank and effecting registry between movement limiting elements of said blanks, comprising positioning one of each kind of blank so that the movement limiting element of one has a predetermined relation in space to the movement limiting element of the other, and thereafter assembling the two blanks and the movement limiting elements thereof in coöperative relation by a movement of one blank relative to the other, said movement including a rotary movement of only one blank relative to the other.

48. The method of assembling a cap blank and a neck blank and effecting registry between movement limiting elements of said blanks, comprising positioning one of each kind of blank so that the movement limiting element of one has a predetermined relation in space to the movement limiting element of the other, and thereafter assembling the two blanks and the movement limiting elements thereof in coöperative relation by a movement of one blank relative to the other and restraining relative rotary movement between the assembled blanks after said coöperative relation between said movement limiting elements has been attained.

49. The method of assembling a cap blank and a neck blank and effecting registry between movement limiting elements of said blanks, comprising positioning one of each kind of blank so that the movement limiting element of one has a predetermined relation in space to the movement limiting element of the other, and thereafter simultaneously assembling the two blanks and the movement limiting elements thereof in coöperative relation by a movement of one blank relative to the other, said movement including a rotary movement of only one blank relative to the other, and restraining relative rotary movement between the assembled blanks after said coöperative relation between said movement limiting elements has been attained.

50. A method of the character described, comprising providing a tubular neck blank and a tubular cap blank with movement limiting elements at predetermined points relative to the longitudinal axes of the tubular blanks, respectively, thereafter positioning said tubular blanks so that the movement limiting element of one occupies a predetermined position in space relative to that of the other, and thereafter assembling the cap blank and the neck blank and the movement limiting elements thereof in coöperative relation by a movement of one blank toward the other without rotation of either blank around its longitudinal axis.

51. A method of the character described, comprising affixing a non-circular body blank to a tubular neck blank, providing the affixed neck blank and a tubular cap blank with movement limiting elements, at predetermined points relative to the longitudinal axes of the tubular blanks, respectively, thereafter positioning said tubular blanks so that the movement limiting element of one occupies a predetermined position in space relative to that of the other, and thereafter assembling the cap blank and the neck blank and the movement limiting elements thereof in coöperative relation by a movement of one blank toward the other without rotation of either blank around its longitudinal axis.

52. In an apparatus of the character described, in combination, means adapted to provide the head of a tubular blank with dispensing openings and a movement limiting slot at predetermined points around the longitudinal axis of said blank comprising punches adapted to pierce said head, and means comprising coöperative press members adapted to compress the raw edges raised in said head by said piercing operation and thereby flatten the same.

53. In an apparatus of the character described, in combination, means comprising piercing punches and a teat adapted to provide the head of a tubular blank with dispensing openings and a nib of raised material of the blank, and means comprising coöperative press members adapted to press said nib and thereby reduce it to a predetermined size.

54. In an apparatus of the character described, in combination, means comprising piercing punches and a teat adapted to provide the head of a tubular blank with dispensing openings and a nib of raised material of the blank, and means comprising coöperative press members adapted to press said nib and thereby reduce it to a predetermined size, said press members comprising a teat on one and a recesss in the other to reduce the size of said nib.

55. In an apparatus of the character described, in combination, a bed frame, a framework for the support of press elements, said framework connected to said bed frame and overhanging the same, two series of press elements supported by said framework opposite said bed frame, and side by side, means adapted to feed material from one press element to another of each series and means adapted to transfer material from one series to the other.

56. In an apparatus of the character described, in combination, a bed frame, a framework for the support of press elements, said framework comprising standards at opposite sides of the bed frame and having portions extending toward each other, and over said frame, two series of press elements, one series operatively supported in one standard extension and the other in the standard extension opposite thereto, means adapted to feed material from one press element to another of each series and means adapted to transfer material from one series to the other, 57. In an apparatus of the character described, in combination, means adapted to dispose a tubular blank having a movement limiting element so that said movement limiting element occupies a predetermined position in space around the longitudinal axis of said blank, means adapted to assemble another tubular blank, having a movement limiting element, in telescopic relation to said first-mentioned blank with the movement limiting elements of said blanks in coöperative relation, and means adapted to expand the lateral wall of one of said blanks and thereby form a keeper element for coöperation with the other blank to retain the blanks in assembled relation.

In testimony whereof I affix my signature, in the presence of two witnesses.

ALEXANDER W. GEORGE.

Witnesses:
J. W. ANDERSON,
C. J. KULBERG.